US009949261B2

(12) United States Patent
Chen et al.

(10) Patent No.: US 9,949,261 B2
(45) Date of Patent: Apr. 17, 2018

(54) METHOD AND APPARATUS FOR CONVEYING RESOURCE ASSIGNMENT FOR MULTIPLE SYSTEM BANDWIDTHS

(75) Inventors: Wanshi Chen, San Diego, CA (US); Juan Montojo, San Diego, CA (US)

(73) Assignee: QUALCOMM Incorporated, San Diego, CA (US)

(\*) Notice: Subject to any disclaimer, the term of this patent is extended or adjusted under 35 U.S.C. 154(b) by 1441 days.

(21) Appl. No.: 12/904,928

(22) Filed: Oct. 14, 2010

(65) Prior Publication Data

US 2011/0255485 A1 Oct. 20, 2011

Related U.S. Application Data

(60) Provisional application No. 61/252,136, filed on Oct. 15, 2009.

(51) Int. Cl.
*H04W 4/00* (2009.01)
*H04W 72/04* (2009.01)
*H04L 5/00* (2006.01)

(52) U.S. Cl.
CPC ....... *H04W 72/0453* (2013.01); *H04L 5/0037* (2013.01); *H04L 5/0094* (2013.01)

(58) Field of Classification Search
CPC . H04W 72/04; H04W 72/0453; H04W 72/00; H04W 48/16; H04L 5/0037; H04L 5/0094; H04L 5/0064; H04L 5/0053
(Continued)

(56) References Cited

U.S. PATENT DOCUMENTS

2008/0310395 A1\* 12/2008 Kashima ............... 370/350
2010/0003996 A1\* 1/2010 Jun et al. .............. 455/450
(Continued)

FOREIGN PATENT DOCUMENTS

CN 101146317 A 3/2008
EP 2136503 A2 12/2009
(Continued)

OTHER PUBLICATIONS

Huawei: "Component carrier structures", 3GPP Draft; R1-090814, 3rd Generation Partnership Project (3GPP), Mobile Competence Centre; 650, Route Des Lucioles ; F-06921 Sophia-Antipolis Cedex ; France, No. Athens, Greece; Feb. 3, 2009, Feb. 3, 2009 (Feb. 3, 2009), XP050318671, [retrieved on Feb. 3, 2009].
(Continued)

*Primary Examiner* — Abdelnabi O Musa
(74) *Attorney, Agent, or Firm* — Patterson & Sheridan, LLP

(57) ABSTRACT

Techniques for supporting communication with user equipment (UEs) of different types on a plurality of system bandwidths are described. UEs of each type may operate on one or more available system bandwidths. Resources assigned to a UE may be conveyed by a resource allocation field of a control message sent to the UE. The resource allocation field may have different configurations (e.g., different sizes and/or interpretations) for different system bandwidths. In one design, the resource allocation field and the control message sent to the UE have different sizes for the plurality of system bandwidths. A base station may determine the size of the resource allocation field based on a system bandwidth selected for the UE. In another design, the resource allocation field may have a same size but different interpretations (e.g., different resource mappings) for the plurality of system bandwidths.

50 Claims, 8 Drawing Sheets

(58) Field of Classification Search
USPC .......................................... 370/329, 330, 331
See application file for complete search history.

(56) References Cited

U.S. PATENT DOCUMENTS

| | | | |
|---|---|---|---|
| 2010/0331030 A1* | 12/2010 | Nory et al. .................. | 455/509 |
| 2011/0205995 A1* | 8/2011 | Grovlen ................ | H04L 5/0007 370/329 |
| 2011/0305211 A1* | 12/2011 | Lunttila ................ | H04L 5/0007 370/329 |
| 2012/0044899 A1* | 2/2012 | Kwon .................... | H04L 5/001 370/329 |

FOREIGN PATENT DOCUMENTS

| | | |
|---|---|---|
| KR | 100921467 B1 | 10/2009 |
| WO | WO2010049754 A1 | 5/2010 |
| WO | WO-2010093006 A1 | 8/2010 |

OTHER PUBLICATIONS

International Search Report and Written Opinion—PCT/US2010/052965, International Search Authority—European Patent Office—Jan. 27, 2011.

Motorola: "Heterogeneous Support for Reliable Downlink Control", 3GPP Draft; R1-093416—Heterogeneous Support for Reliable DL Control Vfinal, 3rd Generation Partnership Project (3GPP), No. Shenzhen, China; Aug. 19, 2009, Aug. 19, 2009, XP050351702.

NEC Group: "DL/UL Resource Signalling for LTE-Advanced System", 3GPP Draft; R1-091693 DL-UL Resource Signalling for LTE-Advanced System, 3rd Generation Partnership Project (3GPP), No. San Francisco, USA; Apr. 28, 2009, Apr. 28, 2009, XP050339232.

Competence Centre ; 650, Route Des Lucioles ; F-06921 Sophia-Antipolis Cedex ; France, No. Seoul, Korea; Mar. 18, 2009, Mar. 18, 2009 (Mar. 18, 2009), XP050339027.

Qualcomm Europe: "Multicarrier Control for LTE-Advanced" 3GPP Draft; R1-091460, 3rd Generation Partnership Project (SGPP), Mobile Competence Centre ; 650, Route Des Lucioles ; F-06921 Sophia-Antipolis Cedex ; France, No. Seoul, Korea; Mar. 18, 2009, Mar. 18, 2009 (Mar. 18, 2009), XP050339027.

Taiwan Search Report—TW099135282—TIPO—Mar. 17, 2014.

3rd Generation Partnership Project; Technical Specification Group Radio Access Network; Evolved Universal Terrestrial Radio Access (E-UTRA); Physical layer procedures (Release 8), 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V8.8.0, Sep. 1, 2009 (Sep. 1, 2009), pp. 1-81, XP050377563.

Alcatel-Lucent: "Search Space sharing with CIF," 3GPP TSG-RAN WG1#61bis, R1-104190, Jun. 28, 2010, pp. 1-4.

CATT: "Issues on cross carrier scheduling", 3GPP Draft; R1-093531, 3rd Generation Partnership Project (3GPP), Mobile Competence Centre ; 650, Route Des Lucioles ; F-06921 Sophia-Antipolis Cedex; France, No. Shenzhen, China; Aug. 19, 2009, Aug. 19, 2009 (Aug. 19, 2009), XP050351790, [retrieved on Aug. 19, 2009].

* cited by examiner

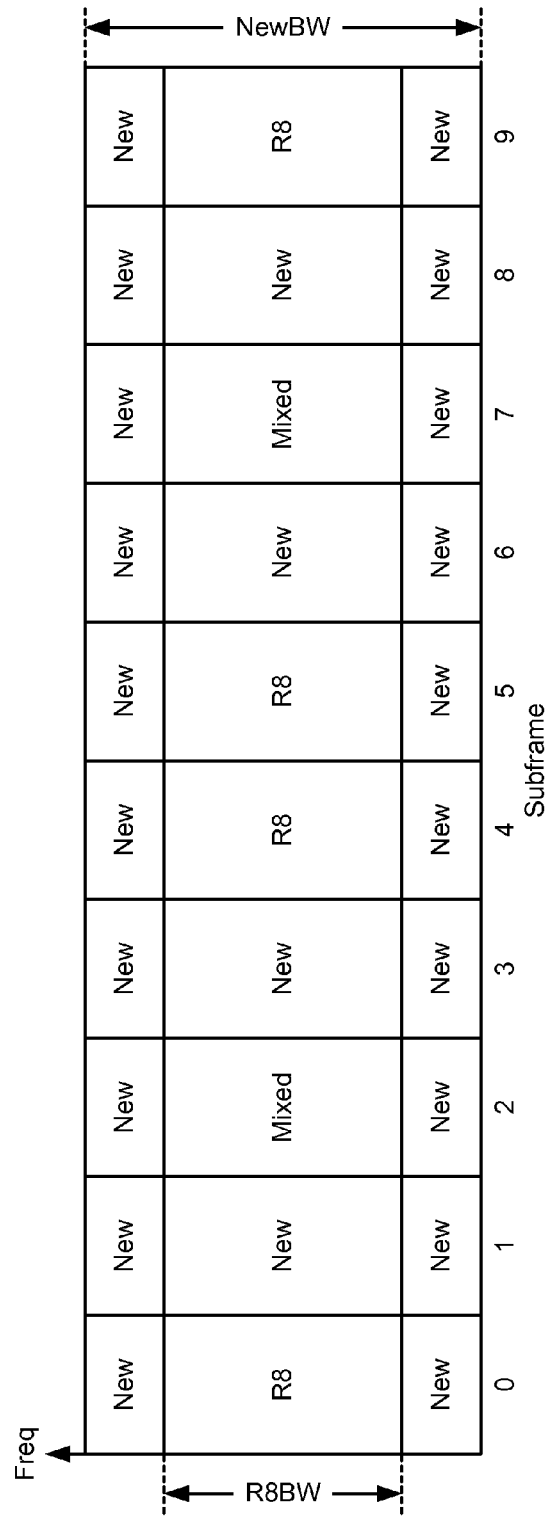

METHOD AND APPARATUS FOR CONVEYING RESOURCE ASSIGNMENT FOR MULTIPLE SYSTEM BANDWIDTHS

The present application claims priority to provisional U.S. Application Ser. No. 61/252,136, entitled "PHYSICAL DOWNLINK CONTROL CHANNEL (PDCCH) DESIGN FOR LTE-A CARRIER EXTENSION," filed Oct. 15, 2009, assigned to the assignee hereof and incorporated herein by reference.

BACKGROUND

I. Field

The present disclosure relates generally to communication, and more specifically to techniques for supporting communication in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for supporting communication with UEs on different system bandwidths are described herein. A system may support a plurality of available system bandwidths (e.g., on a single carrier) for different types of UEs. UEs of each type may operate on and may be assigned resources within one or more of the available system bandwidths. Resources assigned to a given UE may be conveyed by a resource allocation field of a control message sent to the UE.

In an aspect, the resource allocation field may have different configurations for different system bandwidths. In one design, a base station may generate a control message for a UE and may set the resource allocation field of the control message based on a system bandwidth selected for the UE from among the plurality of system bandwidths. The resource allocation field may comprise an indication of resources assigned to the UE for the selected system bandwidth. The base station may send the control message to the UE and may thereafter communicate with (e.g., send data transmission to and/or receive data transmission from) the UE on the assigned resources for the selected system bandwidth.

In general, the plurality of system bandwidths may be associated with at least two different configurations of the resource allocation field for a particular format of the control message. The different configurations of the resource allocation field may correspond to different sizes or different interpretations of the resource allocation field. In one design, the resource allocation field may have different sizes for the plurality of system bandwidths. The base station may determine the size of the resource allocation field based on the selected system bandwidth for the UE. In another design, the resource allocation field may have the same size but different interpretations (e.g., different resource mappings) for the plurality of system bandwidths. The resource mapping for each system bandwidth may define different assigned resources for different settings of the resource allocation field.

In one design, the control message may comprise downlink control information (DCI) and may be generated based on a DCI format selected from a set of DCI formats. In one design, for each DCI format, the resource allocation field may be set (i) in the same manner (e.g., with the same configuration) for all system bandwidths or (ii) in different manners (e.g., with different configurations) for different system bandwidths.

In one design, the resource allocation field may be set in different manners depending on a search space in which the control message is sent. As an example, the resource allocation field may be set based on (i) a first system bandwidth if the control message is sent in a common search space for a plurality of UEs, or (ii) a second system bandwidth if the control message is sent in a UE-specific search space for the UE.

In one design, the resource allocation field may be set in different manners depending on whether the control message is sent as a unicast message to the UE or as a broadcast message to a plurality of UEs. As an example, the resource allocation field may be set based on (i) a first system bandwidth if the control message is sent as a broadcast message or (ii) a second system bandwidth if the control message is sent as a unicast message.

In one design, the UE may receive the control message from the base station and may determine the resources assigned to the UE based on the resource allocation field of the control message. The UE may be configured to operate on the selected system bandwidth. The UE may communicate with the base station on the assigned resources. Various aspects and features of the disclosure are described in further detail below.

BRIEF DESCRIPTION OF THE DRAWINGS

FIGS. 4 and 5 show two designs of multiplexing UEs of different types in different subframes.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
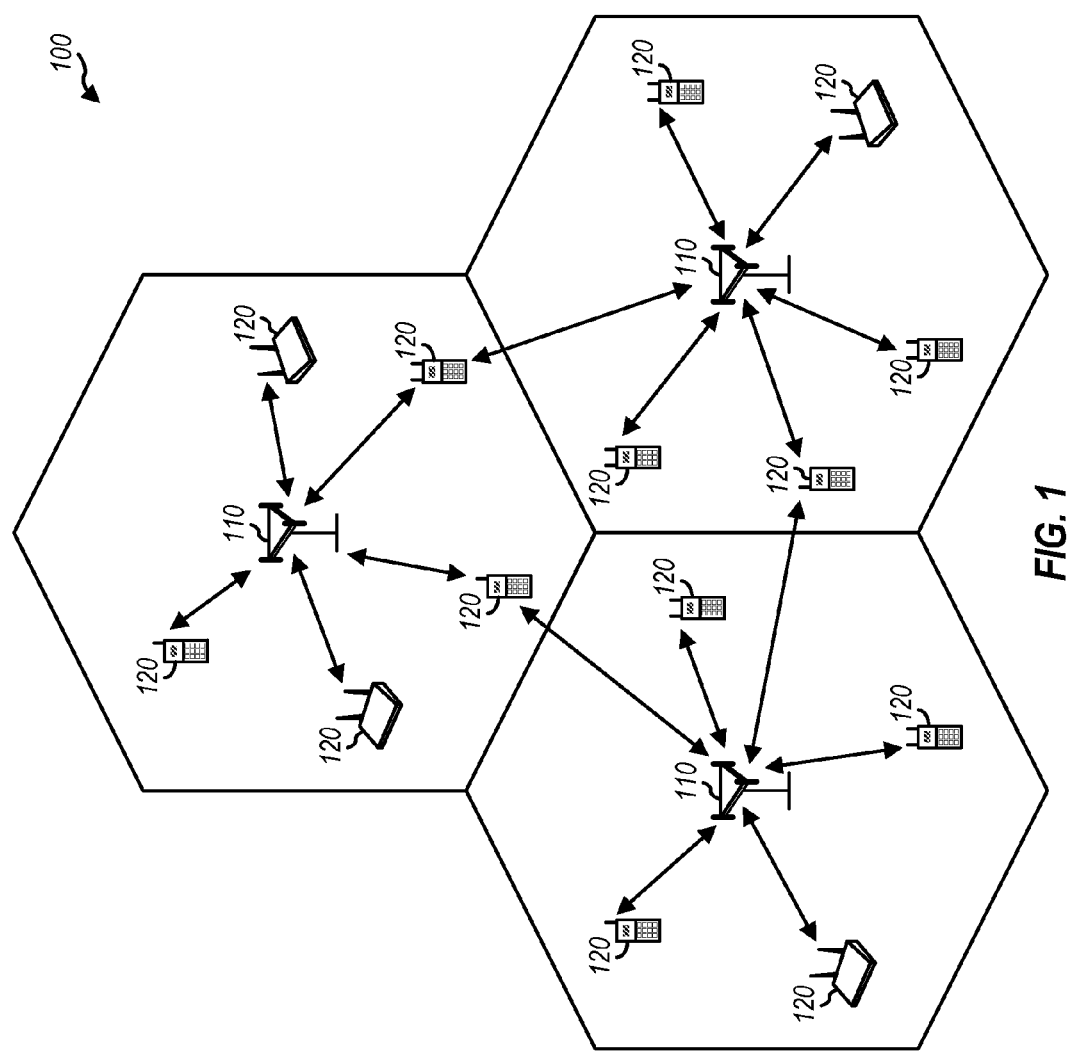
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

The system may utilize frequency division duplexing (FDD) or time division duplexing (TDD). For FDD, the downlink and uplink are allocated separate frequency channels. Downlink transmission and uplink transmission may be sent concurrently on the two frequency channels. For TDD, the downlink and uplink share the same frequency channel. Downlink and uplink transmissions may be sent on the same frequency channel in different time intervals.

Figure 2:
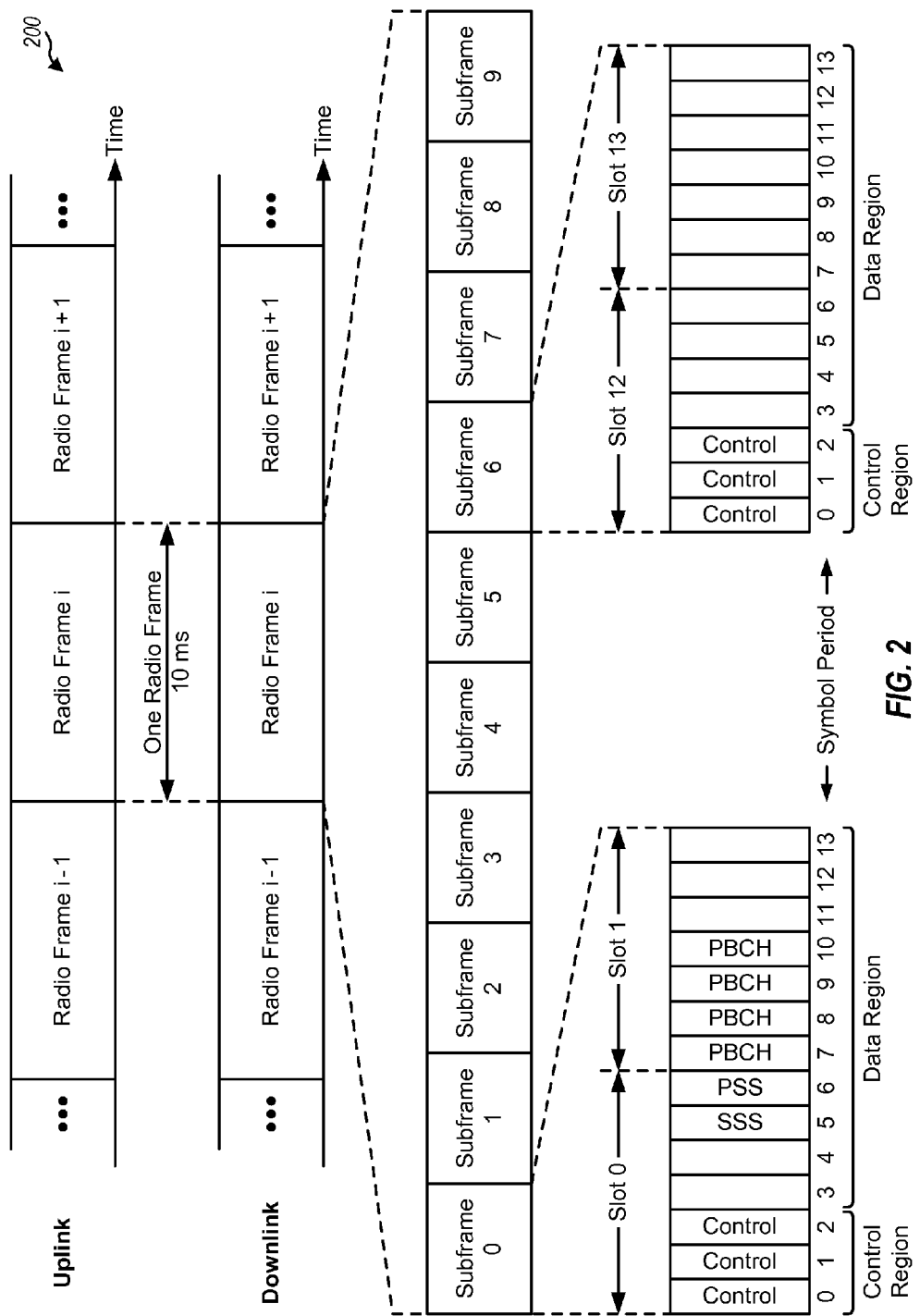
FIG. 2 shows an exemplary frame structure.

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

Each subframe for the downlink may include a control region and a data region, which may be time division multiplexed (TDM) as shown in FIG. 2. The control region may include the first M symbol periods of the subframe, where M may be equal to 1, 2, 3 or 4 and may change from subframe to subframe. The control region may carry control information for UEs. The data region may include the remaining symbol periods of the subframe and may carry traffic data and/or other information for UEs.

An eNB may transmit a Physical Control Format Indicator Channel (PCFICH), a Physical HARQ Indicator Channel (PHICH), and a Physical Downlink Control Channel (PDCCH) in the control region of a subframe. The PCFICH may be transmitted in the first symbol period of the subframe and may convey the size of the control region (i.e., the value of M). The PHICH may carry acknowledgement (ACK) information for data transmission sent on the uplink with hybrid automatic repeat request (HARQ). The PDCCH may carry downlink control information (DCI) for UEs. The DCI may comprise downlink grants, uplink grants, power control information, etc. The eNB may transmit a Physical Downlink Shared Channel (PDSCH) in the data region of a subframe. The PDSCH may carry traffic data for UEs scheduled for data transmission on the downlink.

Each subframe for the uplink may include a control region and a data region, which may be frequency division multiplexed (FDM). The control region may be formed at the two edges of the system bandwidth and may have a configurable size, which may be selected based on the amount of control information being sent on the uplink by UEs. The data region may include the remaining frequency not covered by the control region.

A UE may transmit either a Physical Uplink Control Channel (PUCCH) in the control region or a Physical Uplink Shared Channel (PUSCH) in the data region of a subframe. The PUCCH may carry uplink control information (UCI) such as ACK information for data transmission sent on the downlink, channel quality indicator (CQI) information, scheduling request, etc. The PUSCH may carry only traffic data or both traffic data and UCI from the UE.

The various channels and signals in LTE are described in 3GPP TS 36.211, entitled "Evolved Universal Terrestrial Radio Access (E-UTRA); Physical Channels and Modulation," which is publicly available.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively.

The available time frequency resources for each of the downlink and uplink may be partitioned into physical resource blocks (or simply, resource blocks). In LTE, each resource block covers 12 subcarriers in one slot. The number of resource blocks in each slot is dependent on the system bandwidth and ranges from 6 to 110 for system bandwidth of 1.25 to 20 MHz, respectively. Each resource block includes a number of resource elements. Each resource element covers one subcarrier in one symbol period and may be used to transmit one modulation symbol, which may be a real or complex value.

The system may support different system bandwidths for different UEs on the downlink and/or uplink for carrier extension. In general, any number of system bandwidths may be supported for one carrier on a given link, and each system bandwidth may have any suitable width. In one design, for the downlink, the system may support (i) a first system bandwidth (denoted as R8BW) for legacy UEs and (ii) a second system bandwidth (denoted as NewBW) for new UEs. In one design, for the uplink, the system may support (i) a third system bandwidth (denoted as R8BWUL) for the legacy UEs and (ii) a fourth system bandwidth (denoted as NewBWUL) for the new UEs. As an example, a legacy UE may support LTE Release 8 or 9 or some other release, and a new UE may support a later LTE release. The legacy and new UEs may also be defined in other manners. The second system bandwidth may completely or partially overlap the first system bandwidth. Similarly, the fourth system bandwidth may completely or partially overlap the third system bandwidth. For clarity, much of the description below is for the first and second system bandwidths (i.e., the R8BW and NewBW bandwidths) for the downlink.

Figure 3C:
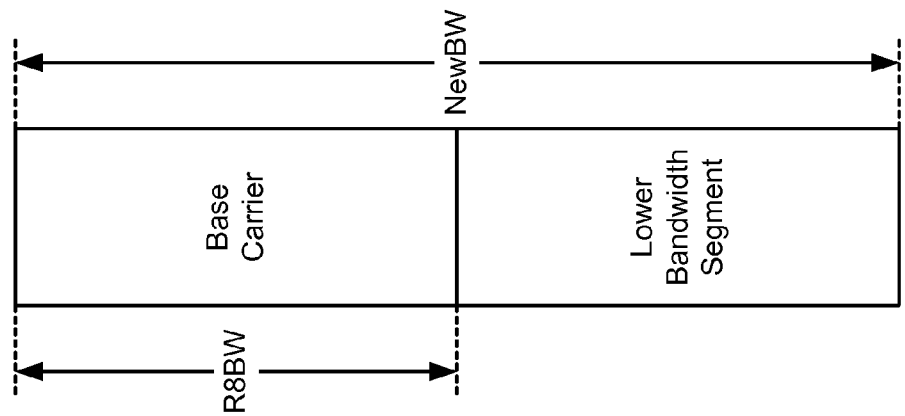
FIGS. 3A, 3B and 3C show different system bandwidths.
Figure 3B:
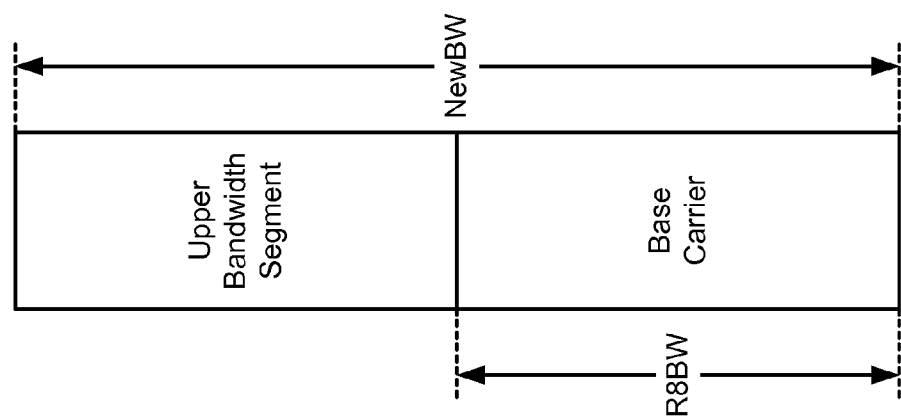
Figure 3A:
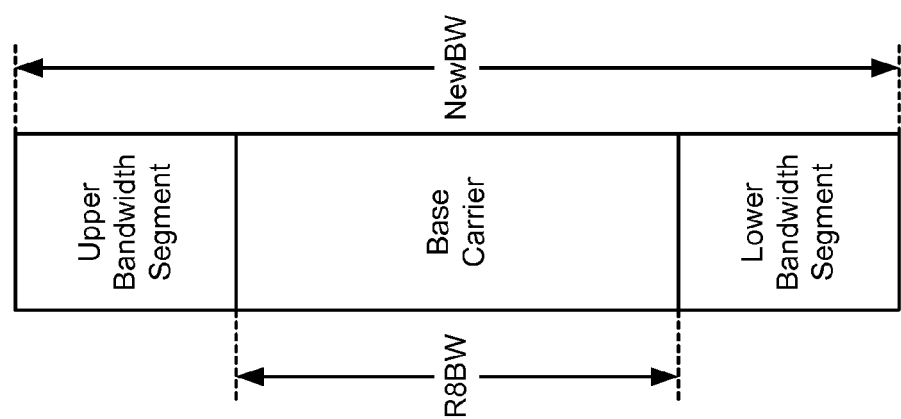

FIG. 3A shows a design of the R8BW and NewBW bandwidths for the legacy and new UEs. In this design, the R8BW bandwidth includes a center part of a frequency range and is referred to as a base carrier. The NewBW bandwidth includes the R8BW bandwidth, an upper bandwidth segment at a high end of the base carrier, and a lower bandwidth segment at a low end of the base carrier. The upper bandwidth segment may or may not be equal to the lower bandwidth segment. In one design, for a system bandwidth of 20 MHz, the R8BW bandwidth covers 100 resource blocks, and the NewBW bandwidth covers 110 resource blocks.

FIG. 3B shows another design of the R8BW and NewBW bandwidths for the legacy and new UEs. In this design, the R8BW bandwidth includes a lower part of a frequency range. The NewBW bandwidth includes the R8BW bandwidth and an upper bandwidth segment at the high end of the R8BW bandwidth.

FIG. 3C shows yet another design of the R8BW and NewBW bandwidths for the legacy and new UEs. In this design, the R8BW bandwidth includes an upper part of a frequency range. The NewBW bandwidth includes the R8BW bandwidth and a lower bandwidth segment at the low end of the R8BW bandwidth.

FIGS. 3A to 3C show three designs of the R8BW and NewBW bandwidths for carrier extension. In general, the NewBW bandwidth may completely overlap the R8BW bandwidth (e.g., as shown in FIGS. 3A to 3C) or may partially overlap the R8BW bandwidth. The NewBW bandwidth may include additional bandwidth on one or both sides of the R8BW bandwidth. The additional bandwidth may be denoted as ΔNewBW and may be accessible to the new UEs but not the legacy UEs. For clarity, much of the description below assumes the design shown in FIG. 3A.

In one design, the legacy and new UEs may be multiplexed in different subframes using TDM. In one design, each subframe on the downlink may be designated as one of the following:

R8 subframe—a subframe in which only the legacy UEs are scheduled,

New subframe—a subframe in which only the new UEs are scheduled, and

Mixed subframe—a subframe in which the legacy and new UEs are scheduled.

In one design, each subframe on the uplink may be similarly designated as an R8 subframe, or a new subframe, or a mixed subframe. In general, any number of subframe types may be supported. Each subframe on each link may be designated as one of the supported subframe types.

FIG. 4 shows an example of multiplexing legacy and new UEs in different subframes of a radio frame on the downlink or uplink. In this example, four subframes 0, 4, 5 and 9 are designated as R8 subframes for the legacy UEs, four subframes 1, 3, 6 and 8 are designated as new subframes for the new UEs, and two subframes 2 and 7 are designated as mixed subframes for the legacy and new UEs.

The ΔNewBW bandwidth may be accessible to only the new UEs and would not need to be backward compatible for the legacy UEs. Hence, the ΔNewBW bandwidth may be used for the new UEs even in R8 subframes and mixed subframes.

FIG. 5 shows a design of multiplexing legacy and new UEs in different subframes and on different parts of the overall system bandwidth. In the example shown in FIG. 5, the R8BW bandwidth occupies the center portion of the NewBW bandwidth, and the two edges of the NewBW bandwidth are accessible to only the new UEs. The center portion of each of subframes 0 through 9 may be used for the legacy UEs, or the new UEs, or both the legacy and new UEs. The two edges of the NewBW bandwidth in each subframe may be used for only the new UEs.

In one design, a mixed subframe may be either (i) a fully compatible mixed subframe referred to as a M1 mixed subframe or (ii) a partially compatible mixed subframe referred to as a M2 mixed subframe. A M1 mixed subframe may include all pertinent channels and signals so that the legacy UEs can be served in similar manner as in an R8 subframe. A M2 mixed subframe may include certain channels and signals such as a primary synchronization signal (PSS), a secondary synchronization signal (SSS), a Physical Broadcast Channel (PBCH), a cell-specific reference signal (CRS), etc., so that the legacy UEs can acquire the system and perform measurements. The legacy UEs may be scheduled for data transmission in a M1 mixed subframe but not in a M2 mixed subframe.

Figure 6A:
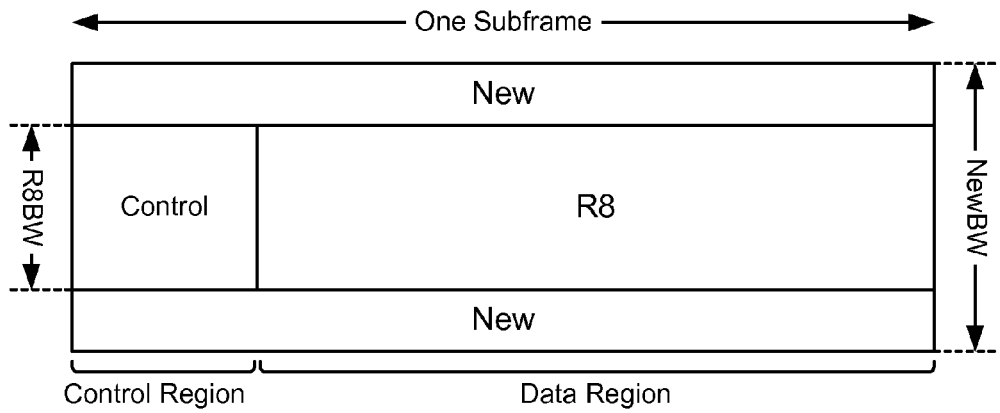
FIGS. 6A, 6B and 6C show three designs of transmitting overhead channels and signals in a subframe.
Figure 6B:
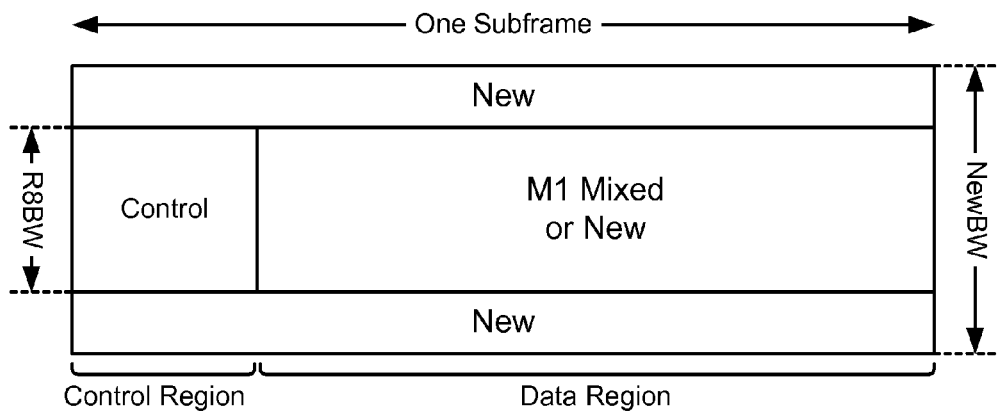

FIG. 6A shows a design of transmitting overhead channels and signals in an R8 subframe on the downlink. FIG. 6B shows a design of transmitting overhead channels and signals in a M1 mixed subframe or a new subframe on the downlink. In the designs shown in FIGS. 6A and 6B, an eNB may transmit the PSS, SSS and PBCH on the center six resource blocks to support system acquisition by all UEs. The eNB may transmit control channels such as the PCFICH, PHICH and PDCCH on the R8BW bandwidth in the control region of the subframe. In one design, the eNB does not transmit any control channel on the additional bandwidth in the control region of the subframe. In this design, for the M1 mixed subframe shown in FIG. 6B, the eNB may transmit control information for the new UEs on control channels sent on the R8BW bandwidth in the control region of the subframe.

In the designs shown in FIGS. 6A and 6B, an eNB may transmit control channels for both the legacy and new UEs on only the R8BW bandwidth (instead of on the NewBW bandwidth) in backward-compatible subframes that support the legacy UEs. The legacy and new UEs may then monitor only the R8BW bandwidth for the control channels.

Figure 6C:
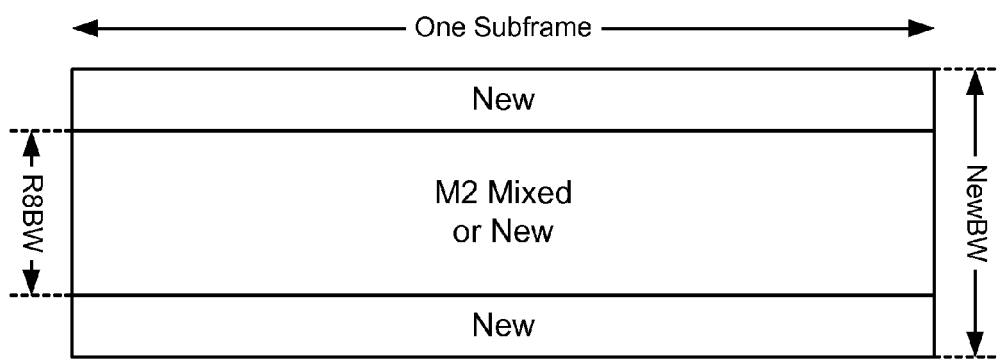

FIG. 6C shows a design of transmitting overhead channels and signals in a M2 mixed subframe or a new subframe for the downlink. In this design, an eNB may or may not transmit control channels in a control region of the subframe. In general, the eNB may transmit control channels for the new UEs using TDM, FDM, and/or some other multiplexing scheme.

In LTE, each data transmission on the downlink or uplink may be accompanied by DCI sent on the PDCCH for the data transmission. The DCI may include a downlink grant for data transmission on the downlink or an uplink grant for data transmission on the uplink. A grant may be sent (i) explicitly for a dynamically scheduled data transmission on the downlink or uplink or (ii) implicitly for a semi-persistently scheduled data transmission on the downlink or a non-adaptive transmission on the uplink. In general, DCI may include one or more grants and/or other control information for one or more UEs.

In LTE, the available physical resource blocks (PRBs) may be assigned sequential indices and may be arranged into resource block groups (RBGs). Each RBG may include up to P consecutive PRBs, where P may be dependent on the system bandwidth and may be equal to 1, 2, 3 or 4. The RBGs may be divided into P RBG subsets, with each RBG subset including every P-th RBG.

LTE Release 8 supports the following resource allocation types:
  Resource allocation type 0—allocate an integer number of RBGs,
  Resource allocation type 1—allocate PRBs within a selected RBG subset, and
  Resource allocation type 2—allocate localized or distributed virtual resource blocks (VRBs).

The terms "allocation" and "assignment" may be used interchangeably, and the terms "allocate" and "assign" may also be used interchangeably.

For resource allocation type 0, a UE may be allocated any one of the available RBGs. Resource allocation information for the UE may be sent in a bitmap having one bit for each RBG. For resource allocation type 1, a UE may be allocated any of the PRBs in a selected RBG subset. Resource allocation information for the UE may include (i) an indication of the selected RBG subset and (ii) a bitmap for the PRBs in the selected RBG subset. For resource allocation type 2, a UE may be allocated a set of contiguous localized or distributed VRBs. A localized VRB with index $n_{VRB}$ may be mapped directly to a PRB with index $n_{PRB}$, so that $n_{VRB}=n_{PRB}$. A distributed VRB with index $n_{VRB}$ may be mapped to a PRB with index $n_{PRB}$ based on a VRB-to-PRB mapping function f( ), so that $n_{VRB}=f(n_{PRB})$. Resource allocation information for the UE may include (i) an indication of whether localized or distributed VRBs are assigned, (ii) an index of the starting VRB allocated to the UE, and (iii) the number of contiguous VRBs allocated to the UE.

LTE supports a number of DCI formats, which are listed in Table 1. DCI format 0 may be used to send uplink grants for data transmission on the uplink. DCI formats 1, 1A, 1B, 1C and 1D may be used to send downlink grants for data transmission of one codeword on the downlink. A codeword may correspond to a transport block or a packet. DCI formats 2, 2A and 2B may be used to send downlink grants for data transmission of two codewords on the downlink for multiple-input multiple output (MIMO). DCI formats 3 and 3A may be used to send transmit power control (TPC) information to UEs. Each DCI format includes a number of fields used to send different types of information. For example, a DCI format for a grant may include fields to convey resources allocated for data transmission, a modulation and coding scheme, precoding information, HARQ information, a TPC command, some other information, or a combination thereof. DCI formats 0, 1A, 3 and 3A have the same size. DCI formats 1, 1B, 1C, 1D, 2, 2A and 2B may have different sizes.

TABLE 1

DCI Formats

| DCI Format | Description |
|---|---|
| 0 | Used for scheduling uplink transmission on the PUSCH. |
| 1 | Used for scheduling transmission of one codeword on the PDSCH. |
| 1A | Used for compact scheduling of one codeword on the PDSCH and for random access procedure. |
| 1B | Used for compact scheduling of one codeword on the PDSCH with precoding information. |
| 1C | Used for very compact scheduling of one codeword on the PDSCH. |
| 1D | Used for compact scheduling of one codeword on the PDSCH with precoding and power offset information. |
| 2 | Used for scheduling of two codewords on the PDSCH with closed-loop spatial multiplexing with cell-specific reference signal (CRS). |
| 2A | Used for scheduling of two codewords on the PDSCH with open-loop spatial multiplexing with CRS. |
| 2B | Used for scheduling of two codewords on the PDSCH with spatial multiplexing with precoded UE-specific reference signal. |
| 3 | Used for transmission of TPC commands for PUCCH and PUSCH with 2-bit power adjustments. |
| 3A | Used for transmission of TPC commands for PUCCH and PUSCH with 1-bit power adjustments. |

The various DCI formats in Table 1 are described in 3GPP TS 36.212, entitled "Evolved Universal Terrestrial Radio Access (E-UTRA); Multiplexing and channel coding," which is publicly available. 3GPP TS 36.212 also describes the various fields of each DCI format.

Table 1 lists a set of DCI formats supported by LTE Release 9. Other DCI formats may also be supported, e.g., in future LTE releases. For example, a DCI format may be defined to support data transmission with MIMO on the uplink. As another example, additional DCI formats may be defined to support transmission of data with other features and/or other information to new UEs.

DCI for a UE for data transmission on the downlink may be referred to as downlink (DL) unicast and may be sent using DCI format 1A or a mode-dependent DCI format. The UE may be configured with a particular transmission mode for data transmission on the downlink in a semi-static manner via higher layers. The configured transmission mode may be one of eight supported transmission modes in LTE Release 9, which include transmit diversity, open-loop spatial multiplexing, closed-loop spatial multiplexing, beamforming, etc. Each transmission mode is associated with two DCI formats of different sizes—DCI format 1A and a mode-dependent DCI format (e.g., DCI format 1, 1B, 1D, 2, 2A, 2B, etc.). DCI for the UE may be sent in either (i) a common search space corresponding to a portion of the control region that is applicable for all UEs or (ii) a UE-specific search space corresponding to a portion of the control region that is applicable for the UE. Only DCI format 1A is used for DCI sent in the common search space, and both DCI format 1A and the mode-dependent DCI format may be used for DCI sent in the UE-specific search space. DCI for the UE may be scrambled with UE-specific Radio Network Temporary Identifiers (RNTIs) such as a Cell RNTI (C-RNTI), a Semi-Persistent Scheduling (SPS) C-RNTI, a Temporary C-RNTI, etc.

DCI for a UE for data transmission on the uplink may be referred to as uplink (UL) unicast and may be sent using DCI format 0, which has the same size as DCI format 1A via zero padding if necessary. Both DCI formats 0 and 1A include a bit to differentiate between the two DCI formats. By using the same size for both DCI formats 0 and 1A, the total number of blind decodes per PDCCH candidate may be limited to two (instead of three). DCI for the UE may be sent in the UE-specific and common search spaces and may be scrambled with the UE-specific RNTIs.

DCI for broadcast services may be referred to as DL broadcast and may include system information, paging information, access response, and/or other information. DCI for DL broadcast may be sent using DCI format 1A or 1C in the common search space. DCI for DL broadcast may be scrambled with RNTIs such as a System Information RNTI (SI-RNTI), a Paging RNTI (P-RNTI), a Random Access RNTI (RA-RNTI), etc., which are known by UEs.

DCI for TPC information may be referred to as group power control and may be sent using DCI format 3 or 3A in the common search space. DCI for TPC information may be scrambled with a TPC-PUCCH RNTI or a TPC-PUSCH RNTI, which are known by UEs.

Table 2 summarizes various types of DCI that may be sent in the UE-specific and common search spaces for the legacy UEs. Table 2 also lists the DCI formats and the RNTIs used for different types of DCI. The resource allocation field for all DCI formats may be set based on the R8BW bandwidth for the legacy UEs.

PDCCH candidates for levels 1, 2, 4, and 8, respectively, in the UE-specific search space. Each PDCCH candidate may correspond to a potential transmission of the PDCCH sent in a particular number of CCEs. Each PDCCH candidate may also be associated with two or more DCI formats, which may have two DCI format sizes in LTE Releases 8 and 9 or more than two DCI format sizes in future LTE Releases. The UE may perform a number of blind decodes for all PDCCH candidates for all PDCCH aggregation levels in both the UE-specific and common search spaces to detect for DCI sent to the UE. The total number of blind decodes may be given as 2×[(4+2)+(6+6+2+2)]=44, where the first "2" is for the two DCI sizes in each search space, the "4+2" is for the number of PDCCH candidates for the two PDCCH aggregation levels for the common search space, and the "6+6+2+2" is for the number of PDCCH candidates for the four PDCCH aggregation levels for the UE-specific search space. The number of blind decodes may be higher for more DCI format sizes, more PDCCH aggregation levels, more search spaces, etc.

The common search space is static but the UE-specific search space may change over time based on a UE-specific RNTI. The UE-specific search space may or may not overlap the common search space. However, within each search space (UE-specific or common search space), the decoding candidates do not have overlapped resources.

Each DCI format that can be used for a downlink grant includes a resource allocation field, which provides a resource assignment or allocation over a particular system bandwidth for the downlink. The resource allocation field may also be referred to as a resource block assignment field,

TABLE 2

DCI Format Structure for Legacy UEs

| Two DCI Sizes | Common Search Space | Two DCI Sizes | UE-Specific Search Space |
|---|---|---|---|
| 0/1A/ 3/3A | 0: UL unicast (UE-specific RNTI)<br>1A: DL unicast (UE-specific RNTI)<br>1A: DL broadcast (SI/P/RA-RNTI)<br>3/3A: Group power control (TPC-PUCCH/PUSCH-RNTI) | 0/1A | 0: UL unicast (UE-specific RNTI)<br>1A: DL unicast (UE-specific RNTI |
| 1C | 1C: DL Broadcast (SI/P/RA-RNTI) | Mode-dep | Mode-dependent DCI formats (1/1B/1D/2/2A/2B/etc.):<br>DL unicast (UE-specific RNTI) |

An eNB may send one instance of the PDCCH in 1, 2, 4, or 8 channel control elements (CCEs), with each CCE including 36 resource elements. The number of CCEs used to send one PDCCH is referred to as a PDCCH aggregation level (or simply, level). Levels 1, 2, 4 and 8 correspond to 1, 2, 4 and 8 CCEs, respectively, used to send one PDCCH. Each PDCCH aggregation level corresponds to a different effective coding rate for DCI sent on the PDCCH.

A UE may attempt to decode the PDCCH in the UE-specific and common search spaces. The common search space has two possible PDCCH aggregation levels (levels 4 and 8) that can be used for a PDCCH sent to the UE. The UE-specific search space has four possible PDCCH aggregation levels (levels 1, 2, 4 and 8) that can be used for a PDCCH sent to the UE. For each PDCCH aggregation level in the UE-specific or common search space, there are two or more PDCCH candidates for the UE to decode. More specifically, there are up to four PDCCH candidates for level 4 and up to two PDCCH candidates for level 8 in the common search space. There are up to six, six, two and two a resource assignment field, etc. The size of the resource allocation field may be dependent on the system bandwidth and the particular resource allocation signaling scheme selected for use. As an example, for resource allocation type 2 with contiguous VRB allocation, the size of the resource allocation field (in number of bits) may be expressed as:

$$N_{BITS} = \left\lceil \log_2\left(\frac{N_{RB} \times (N_{RB} + 1)}{2}\right)\right\rceil, \quad \text{Eq (1)}$$

where $N_{RB}$ is the number of resource blocks for the system bandwidth, $N_{BITS}$ is the number of bits for the resource allocation field, and ⌈ ⌉ denotes a ceiling operation.

$N_{RB}$ may correspond to (i) the number of resource blocks for the system bandwidth on the downlink and given as $N_{RB}=N_{RB}^{DL}$, or (ii) the number of resource blocks for the system bandwidth on the uplink and given as $N_{RB}=N_{RB}^{UL}$, or (iii) the larger of $N_{RB}^{DL}$ and $N_{RB}^{UL}$ and given as $N_{RB}=\max(N_{RB}^{DL}, N_{RB}^{DL})$.

In an aspect, the resource allocation field may be set based on system bandwidth and may have different sizes for different system bandwidths for carrier extension. In one design, the resource allocation field for all DCI formats may be set based on the R8BW bandwidth for the legacy UEs. In one design, the resource allocation field may be set based on either the R8BW or NewBW bandwidth for the new UEs depending on various factors such as the type of DCI being sent, the DCI format being used, the search space in which DCI is sent, etc. The resource allocation field may be set in various manners for the new UEs, as described below.

In a first design for DCI formats 1A and 1C used to send DL broadcast in the common search space, the resource allocation field may be set based on the R8BW bandwidth. The first design may enable DL broadcast to be sent in the same manner and to be received by both the legacy and new UEs. In a second design, DCI for DL broadcast for the legacy UEs may have the resource allocation field set based on the R8BW bandwidth, and DCI for DL broadcast for the new UEs may have the resource allocation field set based on the NewBW bandwidth. For the second design, the legacy and new UEs may have different DCIs for DL broadcast. In a third design, only DCI format 1C may be used to send DL broadcast, and DCI format 1A is not used to send DL broadcast. For the third design, DCI format 1C may be used for backward compatibility, and DCI format 1A may be used for the new UEs for both DL unicast and DL broadcast.

In a first design for DCI formats 3 and 3A used to send group power control in the common search space, the resource allocation field may be set based on the R8BW bandwidth. In a second design, the resource allocation field for DCI formats 3 and 3A may be set based on either the R8BW or NewBW bandwidth depending on whether the DCI is sent to the legacy or new UEs.

In a first design for DCI formats 0 and 1A used to send UL/DL unicast in the common search space, the resource allocation field may be set based on the R8BW bandwidth. For the first design, the number of bits for the resource allocation field may be given as:

$$N_{BITS,R8BW} = \left\lceil \log_2\left(\frac{N_{RB,R8BW} \times (N_{RB,R8BW} + 1)}{2}\right) \right\rceil, \quad \text{Eq (2)}$$

where $N_{RB,R8}BW$ is the number of resource blocks for the R8BW bandwidth, and $N_{BITS,R8}BW$ is the number of bits for the resource allocation field for the R8BW bandwidth.

For the first design, when the new UEs are scheduled via DCI sent in the common search space, only resource blocks in the R8BW bandwidth may be assigned to the new UEs, and resource blocks in the ΔNewBW bandwidth may not be assigned to the new UEs.

In a second design for DCI formats 0 and 1A used to send UL/DL unicast in the common search space, the resource allocation field may be set based on the NewBW bandwidth and may have a larger field size, which may be given as:

$$N_{BITS,NewBW} = \left\lceil \log_2\left(\frac{N_{RB,NewBW} \times (N_{RB,NewBW} + 1)}{2}\right) \right\rceil, \quad \text{Eq (3)}$$

where $N_{RB,NewBW}$ is the number of resource blocks for the NewBW bandwidth, and $N_{BITS,NewBW}$ is the number of bits for the resource allocation field for the NewBW bandwidth.

For the second design, $N_{BITS,NewBW}$ may be greater than $N_{BITS, R8BW}$. In this case, the new UEs may see two different DCI sizes for DCI format 1A used for DL broadcast and DL unicast. For clarity, DCI formats 0 and 1A refer to DCI formats with the resource allocation field set based on the R8BW bandwidth and including $N_{BITS,R8BW}$ bits. DCI formats 0' and 1A' refer to DCI formats with the resource allocation field set based on the NewBW bandwidth and including $N_{BITS,NewBW}$ bits. For the second design, the number of blind decodes would increase if both the legacy DCI formats (e.g., DCI formats 0 and 1A) and the new DCI formats (e.g., DCI formats 0' and 1A') are supported in the common search space, although the false alarm probability may remain the same. Alternatively, only the new DCI formats (e.g., DCI formats 0' and 1A') may be supported in the common search space, and the number of blind decodes would remain unchanged. In this case, DCI format 1C may be used for DL broadcast.

In a third design, DCI formats 0 and 1A are not used to send UL/DL unicast in the common search space. For the third design, the new UEs are not scheduled with DCI for UL/DL unicast sent using DCI format 0 or 1A in the common search space.

In a first design for DCI formats used to send DL unicast in the UE-specific search space, the resource allocation field may be set based on the NewBW bandwidth. For example, DCI formats 1', 1B', 1D', 2', 2A' and 2B' may include all of the fields of DCI formats 1, 1B, 1D, 2, 2A and 2B, respectively, but may have the resource allocation field set based on the NewBW bandwidth and including $N_{BITS,NewBW}$ bits (instead of based on the R8BW bandwidth and including $N_{BITS,R8BW}$ bits).

Table 3 summarizes various types of DCI that may be sent in the UE-specific and common search spaces for the new UEs, in accordance with one design. Table 3 also lists the DCI formats and the RNTIs used for different types of DCI.

TABLE 3

| | DCI Format Structure for New UEs | | |
|---|---|---|---|
| Two DCI Sizes | Common Search Space | Two DCI Sizes | UE-Specific Search Space |
| 0/1A/ 3/3A | 1A: DL broadcast (SI/P/RA-RNTI) Assume R8BW bandwidth 0/1A: UL/DL unicast (UE-specific RNTI) | 0'/ 1A' | 0'/1A': UL/DL unicast (UE-specific RNTI) Assume NewBW bandwidth |

TABLE 3-continued

DCI Format Structure for New UEs

| Two DCI Sizes | Common Search Space | Two DCI Sizes | UE-Specific Search Space |
|---|---|---|---|
| | Assume R8BW bandwidth 3/3A: Group power control (TPC-PUCCH/PUSCH-RNTI) Assume R8BW bandwidth | | |
| 1C | 1C: DL broadcast (SI/P/RA-RNTI) Assume R8BW bandwidth | Mode-dep | Mode-dependent DCI formats (1'/1B'/1D'/2'/2A'/2B'/etc.): DL unicast (UE-specific RNTI) Assume NewBW bandwidth |

In the design shown in Table 3, DCI may be sent in the common search space using various DCI formats with the resource allocation field set based on the R8BW bandwidth. DCI may be sent in the UE-specific search space using various DCI formats with the resource allocation field set based on the NewBW bandwidth. The DCI formats used for the UE-specific search space in Table 3 may have different resource allocation field size than that of the DCI formats used for the UE-specific search space in Table 2 and are denoted with prime designations (e.g., 1') to convey this difference.

The resource allocation field of each DCI format may also be set in other manners for the UE-specific and common search spaces. For example, Table 3 may be modified such that the resource allocation field of all or certain DCI formats used for UL/DL unicast sent in the common search space may be set based on the NewBW bandwidth (instead of the R8BW bandwidth).

In another aspect, the resource allocation field may be set based on system bandwidth and may have the same size but different interpretations for different system bandwidths for carrier extension. The size of the resource allocation field (i.e., the number of bits for the resource allocation field) for the R8BW bandwidth may be given as shown in equation (2). A certain maximum number of resource blocks ($N_{RB,MAX}$) may be conveyed by a given number of bits $N_{BITS}$ of the resource allocation field. This maximum number of resource blocks may be greater than the number of resource blocks ($N_{RB,R8BW}$) for the R8BW bandwidth. The difference between $N_{RB,MAX}$ and $N_{RB,R8BW}$ may represent the number of additional resource blocks ($N_{RB,\Delta}$) that may be conveyed for the additional bandwidth with the $N_{BITS}$ of the resource allocation field.

In one design, the NewBW bandwidth may be limited by an amount such that the number of bits used to indicate a resource allocation would not increase. The amount of additional bandwidth ΔNewBW (i.e., the possible carrier extension range) may be limited such that the number of bits used for the resource allocation field is the same for both the R8BW and NewBW bandwidths. For this design, the resource allocation field of DCI formats 0 and 1A for UL/DL unicast sent in the common search space for the new UEs may be set based on the NewBW bandwidth, without increasing the number of blind decodes and the false alarm probability for the common search space.

Table 4 shows a design of using the same number of bits for the resource allocation field of DCI formats 0 and 1A for both the R8BW and NewBW bandwidths. LTE Release 8 supports six system bandwidths corresponding to 6, 15, 25, 50, 75 and 100 resource blocks, which are shown in the third column of Table 4 under the heading $N_{RB,R8BW}$. These six system bandwidths may be the R8BW bandwidth and may be supported with 5, 7, 9, 11, 12 and 13 bits for the resource allocation field, which are shown in the first column of Table 4 under the heading $N_{BITS}$. The maximum number of resource blocks supported by the $N_{BITS}$ bit of the resource allocation field is shown in the second column of Table 4 under the heading $N_{RB,MAX}$. The range of number of resource blocks that can be supported for the NewBW bandwidth is shown in the fourth column of Table 4 under the heading $N_{RB,NewBW}$. The maximum number of additional resource blocks that may be used for the NewBW bandwidth is shown in the fifth column of Table 4 under the heading $N_{RB,MAX\Delta}$. As shown in Table 4, $N_{RB,MAX\Delta}$ can vary from 0 to 15 (or 27) for different numbers of bits of the resource allocation field. The last row of Table 4 indicates that 13 bits for the resource allocation field can support up to 127 resource blocks. The NewBW bandwidth may be limited to 110 resource blocks for 20 MHz system bandwidth or may cover more than 110 resource blocks.

TABLE 4

| $N_{BITS}$ | $N_{RB, MAX}$ | $N_{RB, R8BW}$ | $N_{RB, NewBW}$ | $N_{RB, Max\Delta}$ |
|---|---|---|---|---|
| 5 | 7 | 6 | 6-7 | 1 |
| 7 | 15 | 15 | 15 | 0 |
| 9 | 31 | 25 | 25-31 | 6 |
| 11 | 63 | 50 | 50-63 | 13 |
| 12 | 90 | 75 | 75-90 | 15 |
| 13 | 127 | 100 | 100-110 (or 127) | 10 (or 27) |

The design shown in Table 4 allows the R8BW and NewBW bandwidths to be supported with the same number of bits for the resource allocation field. The legacy UEs may interpret the resource allocation field based on the R8BW bandwidth whereas the new UEs may interpret the resource allocation field based on the NewBW bandwidth. For a given value of $N_{BITS}$, a legacy UE may determine resources allocated to the legacy UE based on a first resource mapping for the resource allocation field, and a new UE may determine resources allocated to the new UE based on a second resource mapping for the resource allocation field. The second resource mapping may include all entries in the first resource mapping plus additional entries for additional resource blocks for the NewBW bandwidth. Alternatively, the first and second resource mappings may be completely different mappings defined based on the R8BW and NewBW bandwidths, respectively.

For the design shown in Table 4, the number of blind decodes and the false alarm probability are the same for both the legacy and new UEs. This is due to each DCI format having the same size for both the legacy and new UEs, with the same number of bits being used for the resource allocation field for both the R8BW and NewBW bandwidths.

Table 5 summarizes various types of DCI that may be sent in the UE-specific and common search spaces for the new UEs using the same resource allocation field size as for the legacy UEs, in accordance with one design. Table 5 also lists the DCI formats and the RNTIs used for different types of DCI.

TABLE 5

| | DCI Format Structure for New UEs with | | |
|---|---|---|---|
| Two DCI Sizes | Common Search Space | Two DCI Sizes | UE-Specific Search Space |
| 0"/ 1A"/ 3/3A | 1A: DL broadcast (SI/P/RA-RNTI) Assume R8BW bandwidth 0"/1A": UL/DL unicast (UE-specific RNTI) Assume NewBW bandwidth 3/3A: Group power control (TPC-PUCCH/PUSCH-RNTI) Assume R8BW bandwidth | 0"/ 1A" | 0"/1A": UL/DL unicast (UE-specific RNTI) Assume NewBW bandwidth |
| 1C | 1C: DL broadcast (SI/P/RA-RNTI) Assume R8BW bandwidth | Mode-dep | Mode-dependent DCI formats (1"/1B"/1D"/2"/2A"/2B"/etc.): DL unicast (UE-specific RNTI) Assume NewBW bandwidth |

In the design shown in Table 5, DCI formats 0", 1", 1A", 1B", 1D", 2", 2A" and 2B" correspond to (and have the same size as) DCI formats 0, 1, 1A, 1B, 1D, 2, 2A and 2B, respectively. However, DCI formats 0", 1", 1A", 1B", 1D", 2", 2A" and 2B" have the resource allocation field set based on the NewBW bandwidth whereas DCI formats 0, 1, 1A, 1B, 1D, 2, 2A and 2B have the resource allocation field set based on the R8BW bandwidth. DCI formats 0" and 1A" may be used for both the UE-specific and common search spaces without increasing the number of decodes by the new UEs.

Various other designs may also be used for the resource allocation field of different DCI formats. For example, in Table 5, DCI formats 1', 1B', 1D', etc. may be used to send DL unicast in the UE-specific search space instead of DCI formats 1", 1B", 1D", etc.

In one design, the same DCI format structure (e.g., as shown in Table 3 or 5) may be used for the new UEs for all subframes. The new UEs may then interpret DCI received in each subframe based on this DCI format structure. In another design, for subframe-dependent resource allocation field definition, different DCI format structures may be used for the new UEs for different subframes. For example, the new UEs may interpret DCI received in R8 subframes based on a first DCI format structure (e.g., as shown in Table 5) and may interpret DCI received in new subframes based on a second DCI format structure (e.g., as shown in Table 3). The new UEs may interpret DCI received in mixed subframes based on the first or second DCI format structure or a third DCI format structure. Different DCI format structures may support different resource allocation field sizes (e.g., as shown in Table 3) and/or different interpretations of the resource allocation field of the same size (e.g., as shown in Table 5) for each DCI format.

In one design, the resource allocation field may be set in the same manner for all DCI formats for UL/DL unicast for the new UEs, e.g., for DCI sent in the UE-specific search space. For example, the resource allocation field of all DCI formats used for the new UEs in the UE-specific search space may be set based on the NewBW bandwidth and may have different sizes than those of the DCI formats used for the legacy UEs in the UE-specific search space, as shown in Table 3. Alternatively, the resource allocation field of all DCI formats used for the new UEs in the UE-specific search space may have the same size but different interpretations as compared to the DCI formats used for the legacy UEs in the UE-specific search space, as shown in Table 5.

In another design, for DCI format-dependent resource allocation field definition, the resource allocation field may be set in different manners for different DCI formats for UL/DL unicast for the new UEs, e.g., for DCI sent in the UE-specific search space and/or the common search space. For example, DCI formats 0" and 1A" may be used for the new UEs in the UE-specific search space and may have the same size but different interpretations of the resource allocation field as compared to DCI formats 0 and 1A used for the legacy UEs, as shown in Table 5. DCI formats 1', 1B', 1D', 2', 2A', 2B', etc. may be used for the new UEs in the UE-specific search space, and the resource allocation field of these DCI formats may be set based on the NewBW bandwidth and may have different sizes than the corresponding DCI formats 1, 1B, 1D, 2, 2A, 2B, etc. used for the legacy UEs in the UE-specific search space, as shown in Table 3. In general, the resource allocation field of each DCI format used for the new UEs may have a different size and/or a different interpretation as compared to the corresponding DCI format for the legacy UEs.

In one design, for resource allocation type-dependent resource allocation field definition, the resource allocation field may be set in different manners for different resource allocation types for the new UEs. For example, the resource allocation field may have (i) a different size or a different interpretation if a new UE is allocated contiguous VRBs based on resource allocation type 2 or (ii) the same size and interpretation (as for a legacy UE) if the new UE is allocated resources based on resource allocation type 0 or 1. In general, the resource allocation field of a given DCI format used for the new UEs for each resource allocation type may have a different size or a different interpretation as compared to those of the legacy UEs.

In one design, the same set of DCI formats may be used for the R8BW and NewBW bandwidths, e.g., as shown in Tables 2, 3 and 5. In another design, a first set of DCI formats may be used for the R8BW bandwidth, and a second set of DCI formats may be used for the NewBW bandwidth. The first and second sets may include overlapping DCI formats, e.g., the DCI formats for UL/DL unicast in Table 2. The second set may include additional DCI formats for the new UEs.

For clarity, the techniques for conveying resource allocation have been specifically described for two system bandwidths (the R8BW and NewBW bandwidths) for one carrier. In general, the techniques may be used for any number of system bandwidths and any number of carriers. For example, the techniques may be used for each carrier or only certain one(s) of multiple carriers in a multi-carrier system. A carrier may have a guard band originally reserved for the legacy UEs, and some or all of the guard band may be used for the new UEs.

While contiguous resource allocations in which a UE is assigned contiguous resources (e.g., contiguous resource blocks) may be used to illustrate certain aspects of the disclosure, it will be recognized that the techniques described herein may also be used with other resource allocation schemes. For example, the techniques may be used for clustered resource allocation on an uplink in which a UE is assigned two or more non-contiguous clusters of resources, with each cluster including contiguous resources. The resource allocation field may be set in an analogous manner for clustered resource allocation, e.g., with different sizes or different interpretations for different system bandwidths.

Figure 7:
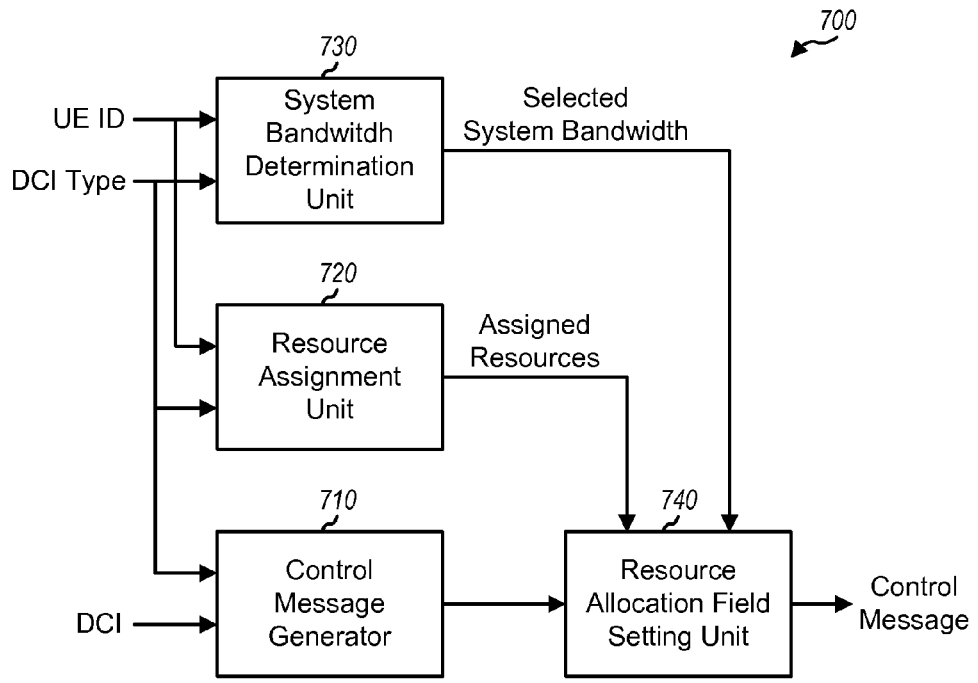
FIG. 7 shows a block diagram of a module for generating control messages.

FIG. 7 shows a block diagram of a design of a module 700 for generating control messages. Module 700 may be part of an eNB or some other entity. Within module 700, a unit 710 may receive DCI for unicast to a UE or broadcast for all UEs and a DCI type (e.g., broadcast or unicast). Unit 710 may select a DCI format based on the DCI type, the search space in which the DCI is sent, a transmission mode configured for the UE, etc. Unit 710 may generate a control message for the DCI based on the selected DCI format. If the DCI is for unicast, then a unit 720 may receive a UE identity (ID) and the DCI type and may assign resources to the UE, e.g., based on one of the resource allocation types described above. If the DCI is for unicast, then a unit 730 may receive the UE ID and the DCI type and may determine a selected system bandwidth for the UE, which may be configured for the UE from among a plurality of system bandwidths. A unit 740 may set the resource allocation field of the control message based on the assigned resources, the selected system bandwidth, the selected DCI format, and/or other information and may provide the control message.

Figure 8:
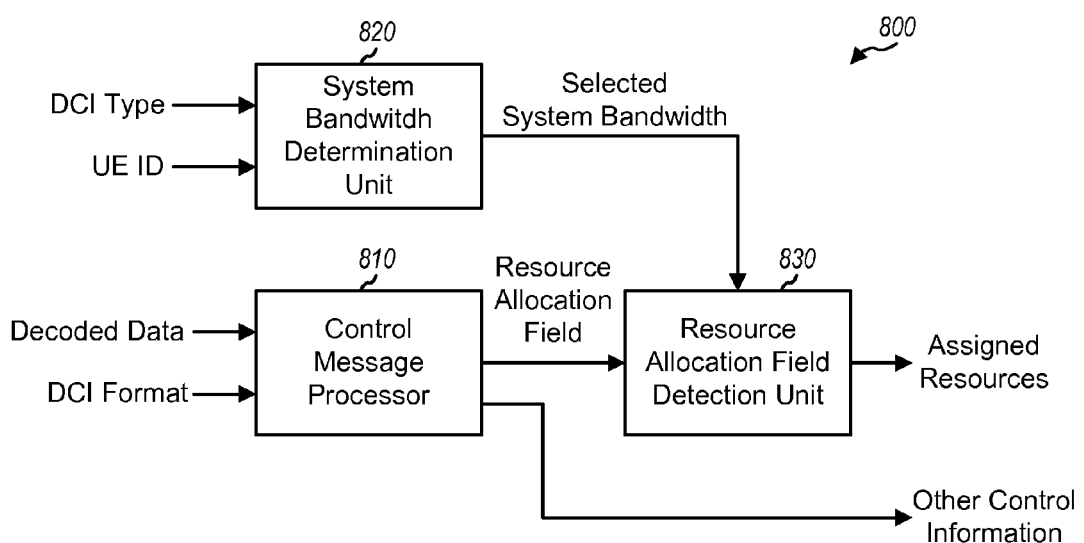
FIG. 8 shows a block diagram of a module for receiving control messages.

FIG. 8 shows a block diagram of a design of a module 800 for receiving control messages. Module 800 may be part of the UE or some other entity. Within module 800, a unit 810 may receive decoded data, which may be obtained by decoding the UE-specific and common search spaces. Unit 810 may process the decoded data based on a DCI format and may provide different types of information in a control message. If the DCI is deemed to be for unicast for the UE, then a unit 820 may receive the UE ID and the DCI type and may determine a selected system bandwidth for the UE. If the DCI is deemed to be for unicast for the UE, then a unit 830 may process the resource allocation field of the control message based on the selected system bandwidth for the UE and may provide the resources assigned to the UE.

Figures 9, 10:
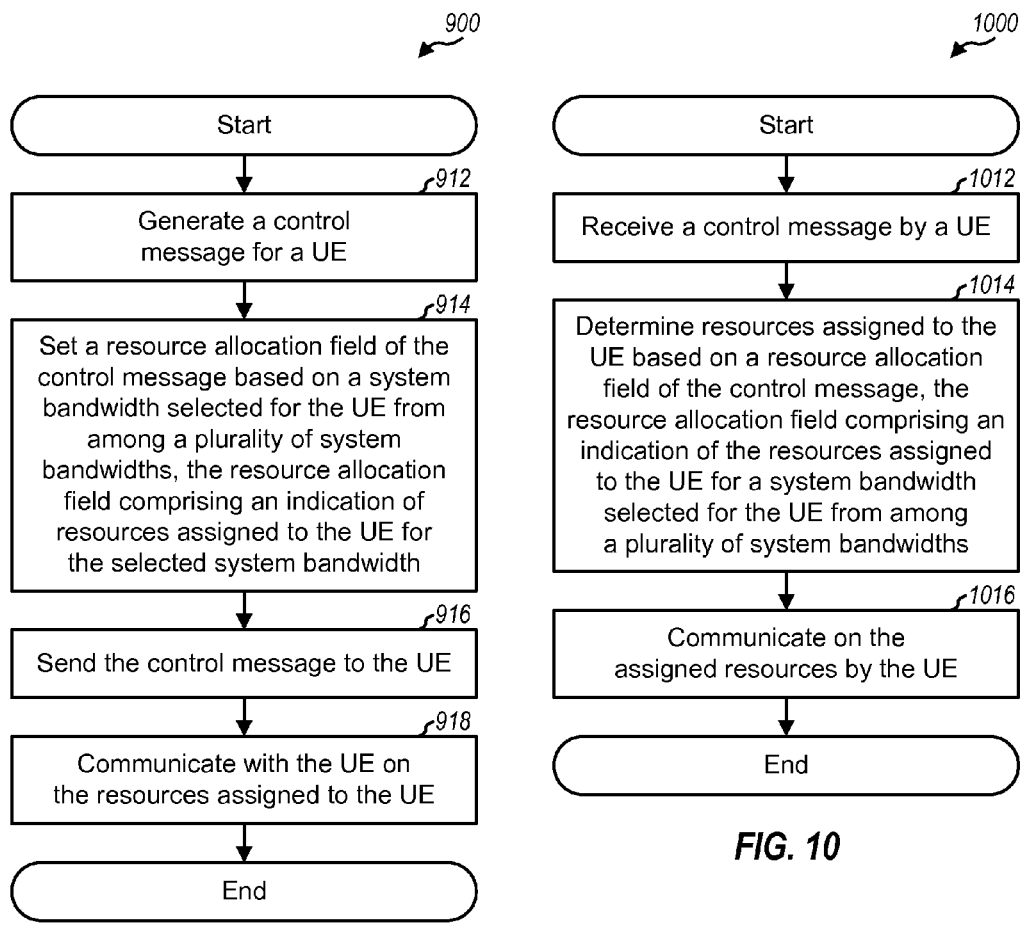
FIG. 9 shows a process for sending control messages.
FIG. 10 shows a process for receiving control messages.

FIG. 9 shows a design of a process 900 for sending control messages. Process 900 may be performed by a base station/eNB (as described below) or by some other entity. The base station may generate a control message for a UE (block 912). The base station may set a resource allocation field of the control message based on a system bandwidth selected for the UE from among a plurality of system bandwidths (block 914). The resource allocation field may comprise an indication of resources assigned to the UE for the selected system bandwidth. The assigned resources may comprise time and/or frequency resources (e.g., resource blocks), orthogonal and/or scrambling codes, transmit power, etc. The base station may send the control message to the UE (block 916) and may thereafter communicate with the UE on the assigned resources (block 918).

In one design, the plurality of system bandwidths may correspond to different frequency ranges of a single carrier and may comprise a first system bandwidth and a second system bandwidth. The second system bandwidth may comprise at least part of the first system bandwidth and an additional bandwidth, e.g., as shown in FIG. 3A, 3B or 3C.

In general, the plurality of system bandwidths may be associated with at least two different configurations of the resource allocation field for a particular format of the control message. The at least two different configurations may correspond to different sizes of the resource allocation field, or different interpretations of the resource allocation field (e.g., different resource mappings), etc.

In one design, the resource allocation field may have different sizes for the plurality of system bandwidths for a particular format of the control message, e.g., as shown in Tables 2 and 3. The base station may determine the size of the resource allocation field based on the selected system bandwidth. The resource allocation field may have (i) a first size if the assigned resources are for the first system bandwidth or (ii) a second size if the assigned resources are for the second system bandwidth. The first and second sizes may be determined based on the first and second system bandwidths, respectively, e.g., as shown in equations (2) and (3).

In another design, the resource allocation field may have the same size but different interpretations (e.g., different resource mappings) for the plurality of system bandwidths for a particular format of the control message, e.g., as shown in Tables 2 and 5. The resource mapping for each system bandwidth may define different assigned resources for a plurality of settings of the resource allocation field. For example, the resource allocation field may be set based on (i) a first resource mapping if the assigned resources are for the first system bandwidth or (ii) a second resource mapping if the assigned resources are for the second system bandwidth. The first resource mapping may define different assigned resources in the first system bandwidth for a first plurality of settings of the resource allocation field. The second resource mapping may define different assigned resources in the second system bandwidth for a second plurality of settings of the resource allocation field.

In one design, the resource allocation field may be set in different manners depending on a search space in which the control message is sent. For example, the resource allocation field may be set based on (i) the first system bandwidth if the control message is sent in a common search space for a plurality of UEs or (ii) the second system bandwidth if the control message is sent in a UE-specific search space for the UE.

In one design, the resource allocation field may be set in different manners depending on whether the control message is sent as a unicast message to the UE or as a broadcast message to a plurality of UEs. For example, the resource allocation field may be set based on (i) the first system bandwidth if the control message is sent as a broadcast message and scrambled with a first identity (e.g., a broadcast RNTI) for the plurality of UEs or (ii) the second system bandwidth if the control message is sent as a unicast message and scrambled with a second identity (e.g., a UE-specific RNTI) for the UE.

In one design, the control message may be generated based on a DCI format selected from a set of DCI formats. In one design, each system bandwidth may be associated with one set of DCI formats, and the plurality of system bandwidths may be associated with at least two different sets of DCI formats.

In one design, for DCI format-dependent resource allocation field definition, the resource allocation field may be set in different manners for different DCI formats. For example, the resource allocation field of certain DCI formats may have the same configuration (e.g., the same size and interpretation) regardless of system bandwidth whereas the resource allocation field of other DCI formats may have different configurations (e.g., different sizes and/or different interpretations) for different system bandwidths. A determination may be made whether the DCI format for the control message is associated with (i) a common configuration of the resource allocation field for the plurality of system bandwidths, or (ii) different configurations of the resource allocation field for the plurality of system bandwidths. The resource allocation field may be set based on (i) the common configuration if the DCI format is associated with the common configuration for all system bandwidths, or (ii) a configuration determined based on the selected system bandwidth if the DCI format is associated with different configurations for different system bandwidths.

In another design, for subframe-dependent resource allocation field definition, the resource allocation field may be set based on a type of subframe in which the control message is sent. A plurality of types of subframe (e.g., R8 subframes, new subframes, mixed subframes, etc.) may be associated with at least two different configurations of the resource allocation field. In yet another design, for resource allocation type-dependent resource allocation field definition, the resource allocation field may be set based on a resource allocation type for the resources assigned to the UE. A plurality of resource allocation types may be associated with at least two different configurations of the resource allocation field.

In one design, the control message may be sent within the first system bandwidth regardless of whether the assigned resources are for the first or second system bandwidth. In another design, the control message may be sent in the first (or second) system bandwidth depending on whether the assigned resources are for the first (or second) system bandwidth.

In one design, the base station may configure the UE to operate on the selected system bandwidth. The base station may send control messages to the UE based on the selected system bandwidth. For example, the base station may set the resource allocation field of each control message sent to the UE based on the selected system bandwidth.

In one design, the assigned resources may be for data transmission on the downlink. The base station may send data transmission on the assigned resources to the UE in block 918. In another design, the assigned resources may be for data transmission on the uplink. The base station may receive data transmission sent on the assigned resources by the UE in block 918.

FIG. 10 shows a design of a process 1000 for receiving control messages. Process 1000 may be performed by a UE (as described below) or by some other entity. The UE may receive a control message (block 1012). The UE may determine resources assigned to the UE based on a resource allocation field of the control message (block 1014). The resource allocation field may comprise an indication of the resources assigned to the UE for a system bandwidth selected for the UE from among a plurality of system bandwidths. The UE may communicate on the assigned resources (block 1016). In one design, the plurality of system bandwidths may comprise a first system bandwidth and a second system bandwidth. The second system bandwidth may comprise at least part of the first system bandwidth and an additional bandwidth.

In one design, the UE may determine the resources assigned to the UE based on the resource allocation field of the control message and in accordance with a DCI format among a plurality of DCI formats. In one design, the resource allocation field of certain DCI formats may have the same configuration regardless of the system bandwidth whereas the resource allocation field of other DCI formats may have different configurations for different system bandwidths.

In one design, the resource allocation field may have different sizes for the plurality of system bandwidths. The UE may determine the size of the resource allocation field based on the selected system bandwidth. The resource allocation field may have (i) a first field size if the assigned resources are for the first system bandwidth, or (ii) a second field size if the assigned resources are for the second system bandwidth. The first size may be determined based on the first system bandwidth, and the second size may be determined based on the second system bandwidth. The UE may determine the resources assigned to the UE based on the resource allocation field of (i) the first size if the assigned resources are for the first system bandwidth, or (ii) the second size if the assigned resources are for the second system bandwidth.

In one design, the resource allocation field may have the same size but different interpretations (e.g., different resource mappings) for the plurality of system bandwidths. The resource mapping for each system bandwidth may define different assigned resources for a plurality of settings of the resource allocation field. The UE may determine the resources assigned to the UE based on (i) a first resource mapping for the resource allocation field if the assigned resources are for the first system bandwidth or (ii) a second resource mapping for the resource allocation field if the assigned resources are for the second system bandwidth.

In one design, the UE may process the resource allocation field in different manners depending on a search space in which the control message is received. The UE may determine the resources assigned to the UE based on (i) the first system bandwidth for the resource allocation field if the control message is received in a common search space for a plurality of UEs, or (ii) the second system bandwidth for the resource allocation field if the control message is received in a UE-specific search space for the UE.

In one design, the UE may process the resource allocation field in different manners depending on whether the control message is sent as a unicast message to the UE or as a broadcast message to all UEs. The UE may determine the resources assigned to the UE based on (i) the first system bandwidth for the resource allocation field if the control message is sent as a broadcast message to a plurality of UEs, or (ii) the second system bandwidth for the resource allocation field if the control message is sent as a unicast message to the UE.

In one design, the assigned resources may be for data transmission on the downlink, and the UE may receive data transmission sent on the assigned resources in block 1016. In another design, the assigned resources may be for data transmission on the uplink, and the UE may send data transmission on the assigned resources in block 1016.

Figure 11:
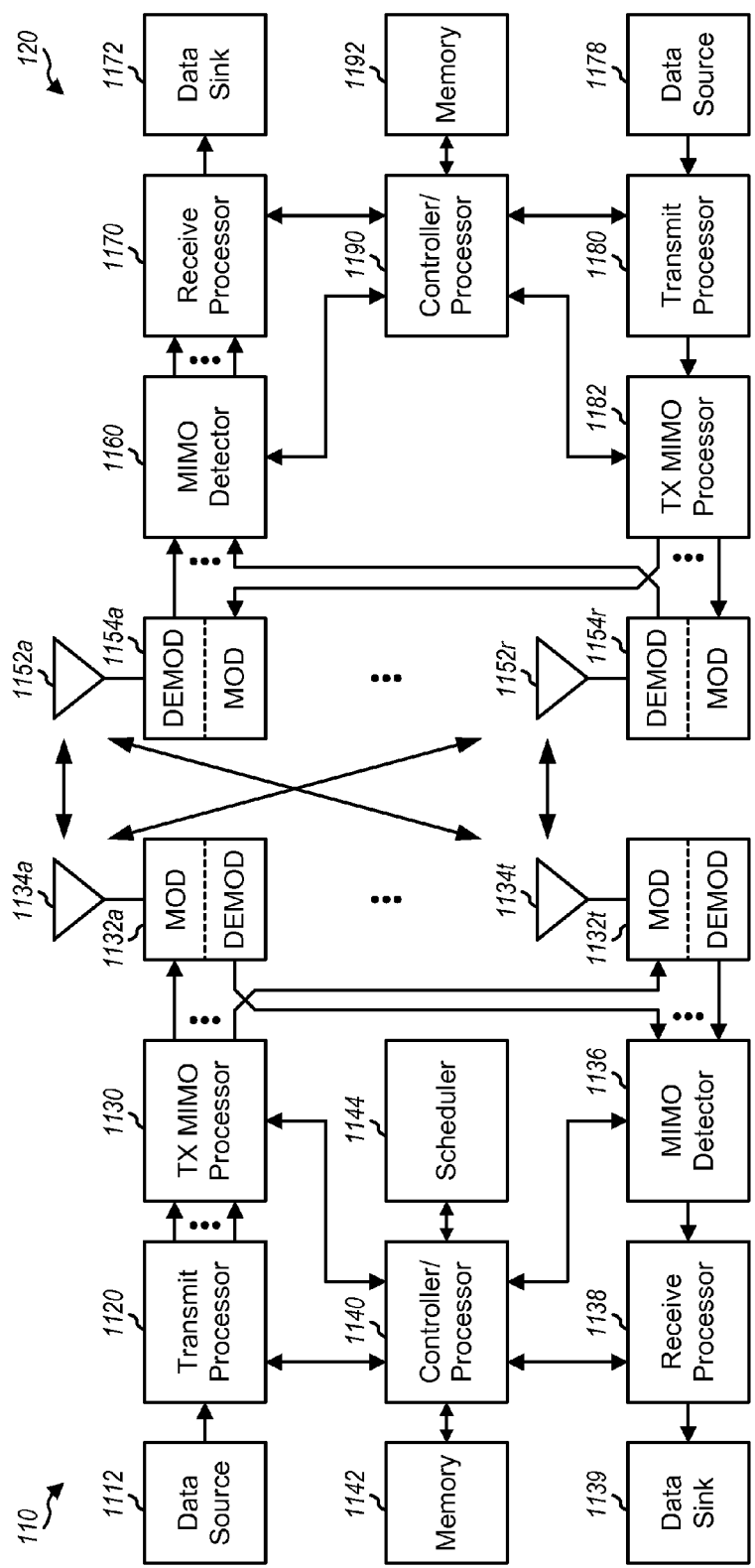
FIG. 11 shows a block diagram of a base station and a UE.

FIG. 11 shows a block diagram of a design of a base station/eNB 110 and a UE 120, which may be one of the base stations/eNBs and one of the UEs in FIG. 1. Base station 110 may be equipped with T antennas 1134a through 1134t, and UE 120 may be equipped with R antennas 1152a through 1152r, where in general T≥1 and R≥1.

At base station 110, a transmit processor 1120 may receive data from a data source 1112 for one or more UEs, process (e.g., encode and modulate) the data for each UE based on one or more modulation and coding schemes selected for that UE, and provide data symbols for all UEs. Transmit processor 1120 may also process control information (e.g., DCI) and provide control symbols. The DCI may comprise control messages for downlink grants, uplink grants, broadcast information, power control information, etc. Transmit processor 1120 may also generate reference symbols for synchronization signals and reference signals. A transmit (TX) MIMO processor 1130 may precode the data symbols, the control symbols, and/or the reference symbols (if applicable) and may provide T output symbol streams to T modulators (MOD) 1132a through 1132t. Each modulator 1132 may process its output symbol stream (e.g., for OFDM, etc.) to obtain an output sample stream. Each modulator 1132 may further condition (e.g., convert to analog, filter, amplify, and upconvert) its output sample stream and generate a downlink signal. T downlink signals from modulators 1132a through 1132t may be transmitted via T antennas 1134a through 1134t, respectively.

At UE 120, R antennas 1152a through 1152r may receive the T downlink signals from eNB 110, and each antenna 1152 may provide a received signal to an associated demodulator (DEMOD) 1154. Each demodulator 1154 may condition (e.g., filter, amplify, downconvert, and digitize) its received signal to obtain samples and may further process the samples (e.g., for OFDM, etc.) to obtain received symbols. A MIMO detector 1160 may obtain received symbols from all demodulators 1154, perform MIMO detection on the received symbols if applicable, and provide detected symbols. A receive processor 1170 may process (e.g., demodulate and decode) the detected symbols, provide decoded data for UE 120 to a data sink 1172, and provide decoded control information to a controller/processor 1190.

On the uplink, at UE 120, data from a data source 1178 and uplink control information (UCI) from controller/processor 1190 may be processed by a transmit processor 1180, precoded by a TX MIMO processor 1182 if applicable, further processed by modulators 1154a through 1154r, and transmitted to base station 110. At base station 110, the uplink signals from UE 120 may be received by antennas 1134, processed by demodulators 1132, detected by a MIMO detector 1136 if applicable, and further processed by a receive processor 1138 to recover the data and control information sent by UE 120. Processor 1138 may provide the recovered data to a data sink 1139 and may provide the recovered UCI to controller/processor 1140.

Controllers/processors 1140 and 1190 may direct the operation at base station 110 and UE 120, respectively. Processor 1140 and/or other processors and modules at base station 110 may perform or direct process 900 in FIG. 9 and/or other processes for the techniques described herein. Processor 1190 and/or other processors and modules at UE 120 may perform or direct process 1000 in FIG. 10 and/or other processes for the techniques described herein. Memories 1142 and 1192 may store data and program codes for base station 110 and UE 120, respectively. A scheduler 1144 may schedule UE 120 and/or other UEs for data transmission on the downlink and/or uplink. Processor 1140, scheduler 1144 and/or other processors at base station 110 may implement module 700 in FIG. 7. Processor 1170, processor 1190, and/or other processors at UE 120 may implement module 800 in FIG. 8.

In one configuration, apparatus 110 for wireless communication may include means for generating a control message for a UE, means for setting a resource allocation field of the control message based on a system bandwidth selected for the UE from among a plurality of system bandwidths, the resource allocation field comprising an indication of resources assigned to the UE for the selected system bandwidth, means for sending the control message to the UE, and means for communicating with the UE on the resources assigned to the UE.

In one configuration, apparatus 120 for wireless communication may include means for receiving a control message by a UE, means for determining resources assigned to the UE based on a resource allocation field of the control message, the resource allocation field comprising an indication of the resources assigned to the UE for a system bandwidth selected for the UE from among a plurality of system bandwidths, and means for communicating on the assigned resources by the UE.

In an aspect, the aforementioned means may be processor(s) 1120, 1138 and/or 1140 at base station 110 and/or processors(s) 1170, 1180 and/or 1190 at UE 120, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    generating a control message for a user equipment (UE);
    setting a resource allocation field of the control message based on a system bandwidth selected for the UE from among a plurality of system bandwidths, the resource allocation field comprising an indication of resources assigned to the UE for the selected system bandwidth;
    sending the control message to the UE; and
    communicating with the UE on the resources assigned to the UE,
    wherein the plurality of system bandwidths is associated with a same size but different interpretations of the resource allocation field for a particular format of the control message.

2. The method of claim 1, wherein the plurality of system bandwidths comprises a first system bandwidth and a second system bandwidth, the second system bandwidth comprising at least part of the first system bandwidth and an additional bandwidth.

3. The method of claim 2, wherein the sending the control message comprises sending the control message within the first system bandwidth regardless of whether the assigned resources are for the first system bandwidth or the second system bandwidth.

4. The method of claim 1, wherein the plurality of system bandwidths is associated with different resource mappings for the resource allocation field, the resource mapping for each system bandwidth defining different assigned resources for a plurality of settings of the resource allocation field.

5. The method of claim 1, wherein the generating the control message comprises generating the control message based on a downlink control information (DCI) format selected from a set of DCI formats.

6. The method of claim 5, wherein each system bandwidth is associated with a set of DCI formats, and wherein the plurality of system bandwidths is associated with at least two different sets of DCI formats.

7. The method of claim 1, further comprising configuring the UE to operate on the selected system bandwidth.

8. The method of claim 1, wherein the assigned resources are for data transmission on downlink, and wherein the communicating with the UE comprises sending a data transmission to the UE on the assigned resources.

9. The method of claim 1, wherein the assigned resources are for data transmission on uplink, and wherein the communicating with the UE comprises receiving a data transmission sent on the assigned resources by the UE.

10. A method for wireless communication, comprising:
    generating a control message for a user equipment (UE);
    setting a resource allocation field of the control message based on a system bandwidth selected for the UE from among a plurality of system bandwidths, the resource allocation field comprising an indication of resources assigned to the UE for the selected system, wherein the setting the resource allocation field comprises setting the resource allocation field based on a type of subframe in which the control message is sent, and wherein a plurality of types of subframe is associated with at least two different configurations of the resource allocation field, and wherein a type of subframe refers to a way in which the subframe is scheduled among different types of UEs;
    sending the control message to the UE; and
    communicating with the UE on the resources assigned to the UE.

11. The method of claim 1, wherein the plurality of system bandwidths corresponds to different frequency ranges of a single carrier.

12. The method of claim 10, wherein the plurality of system bandwidths is associated with at least two different configurations of the resource allocation field for a particular format of the control message.

13. The method of claim 10, wherein the plurality of system bandwidths is associated with different sizes of the resource allocation field for a particular format of the control message.

14. The method of claim 10, further comprising determining a size of the resource allocation field based on the selected system bandwidth.

15. The method of claim 10, wherein the plurality of system bandwidths comprises a first system bandwidth and a second system bandwidth, the second system bandwidth comprising at least part of the first system bandwidth and an additional bandwidth, and wherein the setting the resource allocation field comprises:
  setting a first size of the resource allocation field if the assigned resources are for the first system bandwidth, the first size being determined based on the first system bandwidth, and
  setting a second size of the resource allocation field if the assigned resources are for the second system bandwidth, the second size being determined based on the second system bandwidth.

16. The method of claim 10, wherein the plurality of system bandwidths comprises a first system bandwidth and a second system bandwidth, the second system bandwidth comprising at least part of the first system bandwidth and an additional bandwidth, and wherein the setting the resource allocation field comprises:
  setting the resource allocation field based on a first resource mapping if the assigned resources are for the first system bandwidth, the first resource mapping defining different assigned resources in the first system bandwidth for a first plurality of settings of the resource allocation field, and
  setting the resource allocation field based on a second resource mapping if the assigned resources are for the second system bandwidth, the second resource mapping defining different assigned resources in the second system bandwidth for a second plurality of settings of the resource allocation field.

17. The method of claim 10, wherein the plurality of system bandwidths comprises a first system bandwidth and a second system bandwidth, the second system bandwidth comprising at least part of the first system bandwidth and an additional bandwidth, and wherein the setting the resource allocation field comprises:
  setting the resource allocation field based on the first system bandwidth if the control message is sent in a common search space for a plurality of UEs, and
  setting the resource allocation field based on the second system bandwidth if the control message is sent in a UE-specific search space for the UE.

18. The method of claim 10, wherein the plurality of system bandwidths comprises a first system bandwidth and a second system bandwidth, the second system bandwidth comprising at least part of the first system bandwidth and an additional bandwidth, and wherein the setting the resource allocation field comprises:
  setting the resource allocation field based on the first system bandwidth if the control message is sent as a broadcast message to a plurality of UEs, and
  setting the resource allocation field based on the second system bandwidth if the control message is sent as a unicast message to the UE.

19. The method of claim 10, wherein the generating the control message comprises generating the control message based on a downlink control information (DCI) format selected from a set of DCI formats, the method further comprising:
  determining whether the selected DCI format is associated with a common configuration of the resource allocation field for the plurality of system bandwidths or different configurations of the resource allocation field for the plurality of system bandwidths.

20. The method of claim 10, wherein the setting the resource allocation field comprises setting the resource allocation field based on a resource allocation type for the resources assigned to the UE, and wherein a plurality of resource allocation types is associated with at least two different configurations of the resource allocation field.

21. An apparatus for wireless communication, comprising:
  at least one processor configured to:
  generate a control message for a user equipment (UE),
  set a resource allocation field of the control message based on a system bandwidth selected for the UE from among a plurality of system bandwidths, the resource allocation field comprising an indication of resources assigned to the UE for the selected system bandwidth, wherein the setting the resource allocation field comprises setting the resource allocation field based on a type of subframe in which the control message is sent, and wherein a plurality of types of subframe is associated with at least two different configurations of the resource allocation field, and wherein a type of subframe refers to a way in which the subframe is scheduled among different types of UEs,
  send the control message to the UE, and
  communicate with the UE on the resources assigned to the UE.

22. The apparatus of claim 21, wherein the plurality of system bandwidths is associated with at least two different configurations of the resource allocation field for a particular format of the control message.

23. The apparatus of claim 21, wherein the plurality of system bandwidths is associated with different sizes of the resource allocation field for a particular format of the control message.

24. The apparatus of claim 21, wherein the plurality of system bandwidths is associated with different resource mappings for the resource allocation field, the resource mapping for each system bandwidth defining different assigned resources for a plurality of settings of the resource allocation field.

25. The apparatus of claim 21, wherein the at least one processor is further configured to:
  set the resource allocation field based on a first system bandwidth if the control message is sent in a common search space for a plurality of UEs, and
  set the resource allocation field based on a second system bandwidth if the control message is sent in a UE-specific search space for the UE.

26. The apparatus of claim 21, wherein the at least one processor is further configured to:
  set the resource allocation field based on a first system bandwidth if the control message is sent as a broadcast message to a plurality of UEs, and
  set the resource allocation field based on a second system bandwidth if the control message is sent as a unicast message to the UE.

27. An apparatus for wireless communication, comprising:
at least one processor configured to:
generate a control message for a user equipment (UE),
set a resource allocation field of the control message based on a system bandwidth selected for the UE from among a plurality of system bandwidths, the resource allocation field comprising an indication of resources assigned to the UE for the selected system bandwidth,
send the control message to the UE, and
communicate with the UE on the resources assigned to the UE,
wherein the plurality of system bandwidths is associated with a same size but different interpretations of the resource allocation field for a particular format of the control message.

28. A computer program product, comprising:
a non-transitory computer-readable medium comprising:
code for causing at least one computer to generate a control message for a user equipment (UE),
code for causing the at least one computer to set a resource allocation field of the control message based on a system bandwidth selected for the UE from among a plurality of system bandwidths, the resource allocation field comprising an indication of resources assigned to the UE for the selected system bandwidth,
code for causing the at least one computer to send the control message to the UE, and
code for causing the at least one computer to communicate with the UE on the resources assigned to the UE,
wherein the plurality of system bandwidths is associated with a same size but different interpretations of the resource allocation field for a particular format of the control message.

29. A method for wireless communication, comprising:
receiving a control message by a user equipment (UE);
determining resources assigned to the UE based on a resource allocation field of the control message, the resource allocation field comprising an indication of the resources assigned to the UE for a system bandwidth selected for the UE from among a plurality of system bandwidths, the determining resources including interpreting the resource allocation field based on a type of the UE to determine the system bandwidth from among the plurality of system bandwidths, wherein the plurality of system bandwidths is associated with a same size but different interpretations of the resource allocation field for a particular format of the control message; and
communicating on the assigned resources by the UE.

30. The method of claim 29, wherein the plurality of system bandwidths comprises a first system bandwidth and a second system bandwidth, the second system bandwidth comprising at least part of the first system bandwidth and an additional bandwidth.

31. The method of claim 29, wherein the plurality of system bandwidths comprises different frequency ranges of a single carrier, and wherein the system bandwidth selected for the UE comprises a frequency range of the single carrier available for data transmission to the UE.

32. The method of claim 29, wherein the determining the resources assigned to the UE comprises determining the resources assigned to the UE based on the resource allocation field and in accordance with a downlink control information (DCI) format among a set of DCI formats.

33. The method of claim 29, wherein the assigned resources are for data transmission on downlink, and wherein the communicating on the assigned resources comprises receiving a data transmission sent to the UE on the assigned resources.

34. The method of claim 29, wherein the assigned resources are for data transmission on uplink, and wherein the communicating on the assigned resources comprises sending a data transmission on the assigned resources by the UE.

35. An apparatus for wireless communication, comprising:
at least one processor configured to:
receive a control message by a user equipment (UE),
determine resources assigned to the UE based on a resource allocation field of the control message, the resource allocation field comprising an indication of the resources assigned to the UE for a system bandwidth selected for the UE from among a plurality of system bandwidths, determining resources including interpreting the resource allocation field based on a type of the UE to determine the system bandwidth from among the plurality of system bandwidths, wherein the plurality of system bandwidths is associated with a same size but different interpretations of the resource allocation field for a particular format of the control message, and
communicate on the assigned resources by the UE.

36. The apparatus of claim 35, wherein the at least one processor is configured to determine the resources assigned to the UE based on a first system bandwidth for the resource allocation field if the control message is received in a common search space for a plurality of UEs, and to determine the resources assigned to the UE based on a second system bandwidth for the resource allocation field if the control message is received in a UE-specific search space for the UE.

37. The apparatus of claim 35, wherein the at least one processor is configured to determine the resources assigned to the UE based on a first system bandwidth for the resource allocation field based if the control message is sent as a broadcast message to a plurality of UEs, and to determine the resources assigned to the UE based on a second system bandwidth for the resource allocation field if the control message is sent as a unicast message to the UE.

38. A computer program product, comprising:
a non-transitory computer-readable medium comprising:
code for causing at least one computer to receive a control message by a user equipment (UE),
code for causing the at least one computer to determine resources assigned to the UE based on a resource allocation field of the control message, the resource allocation field comprising an indication of the resources assigned to the UE for a system bandwidth selected for the UE from among a plurality of system bandwidths, determining resources including interpreting the resource allocation field based on a type of the UE to determine the system bandwidth from among the plurality of system bandwidths, wherein the plurality of system bandwidths is associated with a same size but different interpretations of the resource allocation field for a particular format of the control message, and
code for causing the at least one computer to communicate on the assigned resources by the UE.

39. A method for wireless communication, comprising:
receiving a control message by a user equipment (UE);
determining resources assigned to the UE based on a resource allocation field of the control message, the resource allocation field comprising an indication of the resources assigned to the UE for a system bandwidth selected for the UE from among a plurality of system bandwidths, wherein the resource allocation field is based on a type of subframe in which the control message is received, and wherein a plurality of types of subframe is associated with at least two different configurations of the resource allocation field, and wherein a type of subframe refers to a way in which the subframe is scheduled among different types of UEs; and communicating on the assigned resources by the UE.

40. The method of claim 39, further comprising determining a size of the resource allocation field based on the selected system bandwidth.

41. The method of claim 39, wherein the plurality of system bandwidths comprises a first system bandwidth and a second system bandwidth, the second system bandwidth comprising at least part of the first system bandwidth and an additional bandwidth, and wherein the determining the resources assigned to the UE comprises:

determining the resources assigned to the UE based on a first size of the resource allocation field if the assigned resources are for the first system bandwidth, and determining the resources assigned to the UE based on a second size of the resource allocation field if the assigned resources are for the second system bandwidth.

42. The method of claim 39, wherein the plurality of system bandwidths is associated with different resource mappings for the resource allocation field, the resource mapping for each system bandwidth defining different assigned resources for a plurality of settings of the resource allocation field.

43. The method of claim 39, wherein the plurality of system bandwidths comprises a first system bandwidth and a second system bandwidth, the second system bandwidth comprising at least part of the first system bandwidth and an additional bandwidth, and wherein the determining the resources assigned to the UE comprises:

determining the resources assigned to the UE based on a first resource mapping for the resource allocation field if the assigned resources are for the first system bandwidth, the first resource mapping defining different assigned resources in the first system bandwidth for a first plurality of settings of the resource allocation field, and determining the resources assigned to the UE based on a second resource mapping for the resource allocation field if the assigned resources are for the second system bandwidth, the second resource mapping defining different assigned resources in the second system bandwidth for a second plurality of settings of the resource allocation field.

44. The method of claim 39, wherein the plurality of system bandwidths comprises a first system bandwidth and a second system bandwidth, the second system bandwidth comprising at least part of the first system bandwidth and an additional bandwidth, and wherein the determining the resources assigned to the UE comprises:

determining the resources assigned to the UE based on the first system bandwidth for the resource allocation field if the control message is received in a common search space for a plurality of UEs, and determining the resources assigned to the UE based on the second system bandwidth for the resource allocation field if the control message is received in a UE-specific search space for the UE.

45. The method of claim 39, wherein the plurality of system bandwidths comprises a first system bandwidth and a second system bandwidth, the second system bandwidth comprising at least part of the first system bandwidth and an additional bandwidth, and wherein the determining the resources assigned to the UE comprises:

determining the resources assigned to the UE based on the first system bandwidth for the resource allocation field if the control message is sent as a broadcast message to a plurality of UEs, and determining the resources assigned to the UE based on the second system bandwidth for the resource allocation field if the control message is sent as a unicast message to the UE.

46. An apparatus for wireless communication, comprising:

at least one processor configured to:

receive a control message by a user equipment (UE), determine resources assigned to the UE based on a resource allocation field of the control message, the resource allocation field comprising an indication of the resources assigned to the UE for a system bandwidth selected for the UE from among a plurality of system bandwidths, wherein the resource allocation field is based on a type of subframe in which the control message is received, and wherein a plurality of types of subframe is associated with at least two different configurations of the resource allocation field, and wherein a type of subframe refers to a way in which the subframe is scheduled among different types of UEs, and communicate on the assigned resources by the UE.

47. The apparatus of claim 46, wherein the at least one processor is configured to determine a size of the resource allocation field based on the selected system bandwidth.

48. The apparatus of claim 46, wherein the plurality of system bandwidths is associated with different resource mappings for the resource allocation field, the resource mapping for each system bandwidth defining different assigned resources for a plurality of settings of the resource allocation field.

49. A computer program product, comprising:

a non-transitory computer-readable medium comprising:

code for causing at least one computer to receive a control message by a user equipment (UE), code for causing the at least one computer to determine resources assigned to the UE based on a resource allocation field of the control message, the resource allocation field comprising an indication of the resources assigned to the UE for a system bandwidth selected for the UE from among a plurality of system bandwidths, wherein the resource allocation field is based on a type of subframe in which the control message is received, and wherein a plurality of types of subframe is associated with at least two different configurations of the resource allocation field, and wherein a type of subframe refers to a way in which the subframe is scheduled among different types of UEs, and code for causing the at least one computer to communicate on the assigned resources by the UE.

50. A computer program product, comprising:

a non-transitory computer-readable medium comprising:

code for causing at least one computer to generate a control message for a user equipment (UE), code for causing the at least one computer to set a resource allocation field of the control message based on a system bandwidth selected for the UE from among a plurality of system bandwidths, the resource allocation field comprising an indication of resources assigned to the UE for the selected system bandwidth, wherein the setting the resource allocation field comprises setting the resource allocation field based on a type of subframe in which the control message is sent, and wherein a plurality of types of subframe is associated with at least two different configurations of the resource allocation field, and wherein a type of subframe refers to a way in which the subframe is scheduled among different types of UEs, code for causing the at least one computer to send the control message to the UE, and code for causing the at least one computer to communicate with the UE on the resources assigned to the UE.

* * * * *